United States Patent
Chu et al.

(10) Patent No.: US 10,574,418 B2
(45) Date of Patent: Feb. 25, 2020

(54) DETERMINING CHANNEL AVAILABILITY FOR ORTHOGONAL FREQUENCY DIVISION MULTIPLE ACCESS OPERATION

(71) Applicant: Marvell World Trade Ltd., St. Michael (BB)

(72) Inventors: Liwen Chu, San Ramon, CA (US); Yakun Sun, San Jose, CA (US); Leilei Song, Sunnyvale, CA (US); Ken Kinwah Ho, San Jose, CA (US); Tianan Tim Ma, Palo Alto, CA (US); Li-Fu Jeng, San Jose, CA (US); Seong Yong Park, San Jose, CA (US); Foo Keong Tang, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/487,766

(22) Filed: Apr. 14, 2017

(65) Prior Publication Data

US 2017/0302422 A1    Oct. 19, 2017

Related U.S. Application Data

(60) Provisional application No. 62/322,702, filed on Apr. 14, 2016.

(51) Int. Cl.
*H04L 5/00* (2006.01)
*H04W 72/04* (2009.01)
(Continued)

(52) U.S. Cl.
CPC ............ *H04L 5/0053* (2013.01); *H04L 5/006* (2013.01); *H04L 5/0007* (2013.01);
(Continued)

(58) Field of Classification Search
CPC ..................................................... H04L 5/0007
See application file for complete search history.

(56) References Cited

U.S. PATENT DOCUMENTS

| 5,613,194 A | 3/1997 | Olds et al. |
| 6,169,761 B1 | 1/2001 | Marcoccia et al. |
| (Continued) | | |

FOREIGN PATENT DOCUMENTS

| JP | 2003-348641 A | 12/2003 |
| JP | 2008-503958 A | 2/2008 |
| (Continued) | | |

OTHER PUBLICATIONS

International Search Report and Written Opinion in International Patent Application No. PCT/US2017/027608, dated Jul. 20, 2017 (13 pages).

(Continued)

*Primary Examiner* — Asad M Nawaz
*Assistant Examiner* — Syed Ali

(57) ABSTRACT

A first communication device receives a first data unit from a second communication device via one or more communication channels. The first data unit includes an indication of a first set of one or more sub-channels allocated to the first communication device, and the first data unit is configured to prompt the first communication device to transmit channel availability information as part of a subsequent orthogonal frequency division multiple access (OFDMA) transmission. The first communication device determines channel availability information for the one or more communication channels, and when the first communication device determines that at least one of the communication channels is idle, the first communication device transmits a second data unit to the second communication device in one or more sub-channels allocated to the first communication device as (Continued)

part of the OFDMA transmission, the second data unit including the channel availability information.

8 Claims, 9 Drawing Sheets

(51) Int. Cl.
*H04W 72/08* (2009.01)
*H04W 88/08* (2009.01)
*H04W 84/12* (2009.01)

(52) U.S. Cl.
CPC ... *H04W 72/0406* (2013.01); *H04W 72/0453* (2013.01); *H04W 72/085* (2013.01); *H04L 5/0057* (2013.01); *H04W 84/12* (2013.01); *H04W 88/08* (2013.01)

(56) References Cited

U.S. PATENT DOCUMENTS

| | | |
|---|---|---|
| 6,862,440 B2 | 3/2005 | Sampath |
| 7,206,354 B2 | 4/2007 | Wallace et al. |
| 7,486,740 B2 | 2/2009 | Inanoglu |
| 7,599,332 B2 | 10/2009 | Zelst et al. |
| 7,729,439 B2 | 6/2010 | Zhang et al. |
| 7,742,390 B2 | 6/2010 | Mujtaba |
| 8,068,455 B2 | 11/2011 | Utsunomiya et al. |
| 8,155,138 B2 | 4/2012 | van Nee |
| 8,270,909 B2 | 9/2012 | Zhang et al. |
| 8,339,978 B2 | 12/2012 | Sawai et al. |
| 8,345,584 B2 | 1/2013 | Rohfleisch et al. |
| 8,363,578 B1 | 1/2013 | Ramamurthy et al. |
| 8,599,804 B2 | 12/2013 | Erceg et al. |
| 8,619,907 B2 | 12/2013 | Mujtaba et al. |
| 8,670,399 B2 | 3/2014 | Liu et al. |
| 8,724,720 B2 | 5/2014 | Srinivasa et al. |
| 8,737,405 B2 | 5/2014 | Liu et al. |
| 8,787,338 B2 | 7/2014 | Liu et al. |
| 8,787,385 B2 | 7/2014 | Liu et al. |
| 8,811,203 B1 | 8/2014 | Liu et al. |
| 8,867,653 B2 | 10/2014 | Zhang et al. |
| 8,923,118 B1 | 12/2014 | Liu et al. |
| 8,948,283 B2 | 2/2015 | Zhang |
| 8,971,350 B1 | 3/2015 | Liu |
| 9,088,908 B2 | 7/2015 | Liu |
| 9,130,727 B2 | 9/2015 | Zhang et al. |
| 9,237,081 B2 | 1/2016 | Liu et al. |
| 9,655,002 B2 | 5/2017 | Zhang et al. |
| 9,826,532 B1 | 11/2017 | Chu et al. |
| 9,900,878 B2 | 2/2018 | Seok |
| 9,942,193 B1 | 4/2018 | Chu et al. |
| 10,306,603 B1 | 5/2019 | Chu et al. |
| 2006/0063492 A1 | 3/2006 | Iacono et al. |
| 2006/0146869 A1 | 7/2006 | Zhang et al. |
| 2006/0217125 A1 | 9/2006 | Miyazaki |
| 2006/0268760 A1 | 11/2006 | Fang et al. |
| 2007/0008884 A1 | 1/2007 | Tang |
| 2007/0060155 A1 | 3/2007 | Kahana et al. |
| 2007/0070922 A1 | 3/2007 | Benveniste |
| 2007/0297353 A1 | 12/2007 | Habetha et al. |
| 2008/0080553 A1 | 4/2008 | Hasty et al. |
| 2008/0112340 A1 | 5/2008 | Luebke |
| 2008/0192644 A1 | 8/2008 | Utsunomiya et al. |
| 2009/0059877 A1 | 3/2009 | Utsunomiya et al. |
| 2009/0067403 A1 | 3/2009 | Chan et al. |
| 2009/0196163 A1 | 8/2009 | Du |
| 2009/0285116 A1 | 11/2009 | Nanda et al. |
| 2010/0046656 A1 | 2/2010 | van Nee et al. |
| 2010/0056069 A1 | 3/2010 | Toshimitsu et al. |
| 2010/0142468 A1 | 6/2010 | Cheong et al. |
| 2010/0260159 A1 | 10/2010 | Zhang et al. |
| 2011/0002219 A1 | 1/2011 | Kim et al. |
| 2011/0194542 A1 | 8/2011 | Kim et al. |
| 2011/0235576 A1 | 9/2011 | Gong et al. |
| 2011/0268094 A1 | 11/2011 | Gong et al. |
| 2011/0305156 A1 | 12/2011 | Liu et al. |
| 2011/0305288 A1 | 12/2011 | Liu et al. |
| 2011/0310930 A1 | 12/2011 | Gerhardt et al. |
| 2012/0039196 A1 | 2/2012 | Zhang |
| 2012/0057492 A1 | 3/2012 | Goel et al. |
| 2012/0057534 A1 | 3/2012 | Park |
| 2012/0082040 A1 | 4/2012 | Gong et al. |
| 2012/0082045 A1 | 4/2012 | Liu et al. |
| 2012/0082056 A1 | 4/2012 | Horisaki et al. |
| 2012/0082147 A1 | 4/2012 | Liu et al. |
| 2012/0201213 A1* | 8/2012 | Banerjea .......... H04W 72/0453 370/329 |
| 2012/0294294 A1 | 11/2012 | Zhang |
| 2012/0314653 A1 | 12/2012 | Liu |
| 2013/0070668 A1 | 3/2013 | Merlin et al. |
| 2013/0202001 A1 | 8/2013 | Zhang |
| 2013/0229996 A1 | 9/2013 | Wang et al. |
| 2014/0086200 A1 | 3/2014 | Seok |
| 2014/0198692 A1 | 7/2014 | Torab Jahromi et al. |
| 2014/0328235 A1 | 11/2014 | Merlin et al. |
| 2015/0131517 A1 | 5/2015 | Chu et al. |
| 2016/0014803 A1 | 1/2016 | Merlin et al. |
| 2016/0014804 A1* | 1/2016 | Merlin .................. H04L 5/0044 370/329 |
| 2016/0050659 A1* | 2/2016 | Seok ..................... H04L 1/0003 370/338 |
| 2016/0080115 A1 | 3/2016 | Josiam et al. |
| 2016/0127228 A1 | 5/2016 | Liu et al. |
| 2016/0227599 A1 | 8/2016 | Lee et al. |
| 2016/0323426 A1* | 11/2016 | Hedayat ............ H04W 28/0268 |
| 2016/0330788 A1 | 11/2016 | Zhang et al. |
| 2016/0366254 A1 | 12/2016 | Asterjadhi et al. |
| 2017/0070267 A1* | 3/2017 | Nabetani ................. H04B 7/04 |
| 2017/0170937 A1 | 6/2017 | Chun et al. |
| 2017/0294992 A1 | 10/2017 | Chu et al. |
| 2017/0311310 A1 | 10/2017 | Ryu et al. |
| 2017/0359159 A1* | 12/2017 | Kim ......................... H04L 1/16 |
| 2018/0020460 A1 | 1/2018 | Hedayat |
| 2018/0160429 A1* | 6/2018 | Seok ................... H04L 27/2627 |
| 2018/0213566 A1* | 7/2018 | Baron ............... H04W 72/1242 |
| 2018/0242283 A1* | 8/2018 | Feng ...................... H04L 5/001 |
| 2018/0310330 A1* | 10/2018 | Chun .................... H04L 5/0053 |
| 2018/0375632 A1* | 12/2018 | Kim ...................... H04L 5/0053 |
| 2019/0007973 A1* | 1/2019 | Lou ...................... H04W 7/082 |
| 2019/0208505 A1* | 7/2019 | Park .................... H04W 72/042 |
| 2019/0230709 A1* | 7/2019 | Li ..................... H04W 74/0816 |

FOREIGN PATENT DOCUMENTS

| | | |
|---|---|---|
| JP | 2008-199102 A | 8/2008 |
| JP | 2010-056761 A | 3/2010 |
| JP | 2011-525085 A | 9/2011 |
| WO | WO-2006-000955 | 1/2006 |
| WO | WO-2009-0154406 A2 | 12/2009 |
| WO | WO-2012-047643 A2 | 4/2012 |
| WO | WO-2015/172098 | 11/2015 |
| WO | WO-2011/099729 | 8/2017 |

OTHER PUBLICATIONS

IEEE 802.20-PD-06; IEEE P 802.20™ V14, Draft 802.20 Permanent Document; <System Requirements for IEEE 802.20 Mobile Broadband Wireless Access Systems—Version 14>, 24 pages (Jul. 16, 2004).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," *IEEE Computer Society*, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical

(56) References Cited

OTHER PUBLICATIONS

Layer (PHY) Specifications, Amendment 6: Enhancements for High Efficiency WLAN," *IEEE Computer Society*, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," *IEEE Computer Society*, 376 pages (Sep. 2016).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11™ 2012 (Revision of IEEE Std 802.11—2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.16—2009 (Revision of IEEE Std. 802.16—2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

Cariou et al., "Multi-channel Transmissions," Doc. No. IEEE 802.11-09/1022r0, *The Institute of Electrical and Electronics Engineers, Inc.*(Sep. 2009).

Kwon et al., "SIG Structure for UL PPDU," IEEE Draft, doc. IEEE 802.11-15/0574r0, vol. 802.11ax, 18 pages (May 11, 2015).

Merlin et al., "Trigger Frame Format," IEEE Draft, doc. IEEE 802.11-15/0877r1, vol. 802.11ax, No. 1, 16 pages (Jul. 13, 2015).

Noh et al., "Channel Selection and Management for 11ac," Doc. No. IEEE 802.11-10/0593r1, *The Institute of Electrical and Electronics Engineers, Inc.* (May 20, 2010).

Park, "IEEE 802.11ac: Dynamic Bandwidth Channel Access," 2011 IEEE Int'l Conf. on Communications (ICC), pp. 1-5 (Jun. 2011).

Pedersen et al., "Carrier Aggregation for LTE-Advanced: Functionality and Performance Aspects," IEEE Communications Magazine, vol. 49, No. 6, pp. 89-95, (Jun. 1, 2011).

Redieteab et al., "Cross-Layer Multichannel Aggregation for Future WLAN Systems," 2010 IEEE Int'l Conf. on Communication Systems (ICCS), pp. 740-745 (Nov. 2010).

Seok et al., "HEW PPDU Format for Supporting MIMO-OFDMA," IEEE 802.11-14/1210r0, Sep. 14, 2014 (16 pages).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

U.S. Appl. No. 62/321,703, Chu et al., "HE Control Field Content," filed Apr. 12, 2016.

Yuan et al., "Carrier Aggregation for LTE-Advanced Mobile Communication Systems," IEEE Communications Magazine, pp. 88-93 (Feb. 2010).

U.S. Appl. No. 16/422,459, Chu et al., "Communicating Subchannel Availability Information in a Wireless Local Area Network," filed May 24, 2019.

de Vegt, "Potential Compromise for 802.11ah Use Case Document," Institute of Electrical and Electronics Engineers, doc. No. IEEE 802.11-11/0457r0, pp. 1-27 (Mar. 2011).

Fischer et al., "Link Adaptation Subfield for VHT," doc. No. IEEE 802.11-10/1095r0, IEEE 802.11-10, 123rd IEEE 802.11 Wireless Local Area Networks session, Interim Meeting Session, Hilton Waikoloa Village, pp. 1-5 (Sep. 12, 2010).

Hiertz et al., "The IEEE 802.11 Universe," IEEE Communications Magazine, pp. 62-70, (Jan. 2010).

IEEE Std 802.11—REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

IEEE Std 802.11ac™—2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE Std 802.16™—2012 (Revision of IEEE Std. 802.16—2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

Liu et al., "VHT BSS Channel Selection," *Institute of Electrical and Electronics Engineers, Inc.*, doc. No. IEEE 802.11-11/1433r0, pp. 1-10 (Nov. 2011).

Love et al., "An Overview of Limited Feedback in Wireless Communication Systems," IEEE J. on Selected Areas in Communications, vo. 26, No. 8, pp. 1341-1365 (Oct. 2008).

Merlin et al., "VHT Control and Link Adaptation, doc. No. IEEE 802.11-11/0040r0," IEEE 802.22-11, 125th IEEE 802.11 Wireless Local Area Networks Session, Interim Meeting Session, Hyatt Century Plaza Hotel, Los Angeles, California, pp. 1-15 (Jan. 18, 2011).

Park et al., "Low Power Capability Support for 802.11ah," doc. No. IEEE 802.11-11/0060r1, *The Institute for Electrical and Electronics Engineers*, 7 pages (Jan. 17, 2011).

Park, "Proposed Specification Framework for TGah D9.x", The Institute of Electrical and Electronics Engineers, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11—yy/xxxxr05, pp. 1-12 (Jan. 2012).

Park, "Proposed Specification Framework for TGah", *The Institute of Electrical and Electronics Engineers*, doc. No. IEEE 802.11-11/1137r11, pp. 1-36 (Sep. 2012).

Park, "Proposed Specification Framework for TGah", *The Institute of Electrical and Electronics Engineers*, doc. No. IEEE 802.11-11/1137r6, pp. 1-13 (Mar. 2012).

Park, "Specification Framework for TGah," *The Institute of Electrical and Electronics Engineers*, doc. No. IEEE 802.11-11/1137r13, pp. 1-58 (Jan. 14, 2013).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Shao, "Channel Selection for 802.11ah," doc.: IEEE 802.11-12/0816r0, pp. 1-11 (Jul. 2012).

Shi et al., "Phase Tracking During VHT-LTF," Doc. No. IEEE 802.11-10/0771r0, *The Institute of Electrical and Electronics Engineers, Inc.*, pp. 1-19 (Jul. 2010).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

(56) References Cited

OTHER PUBLICATIONS

Stacey, "Specification Framework for TGax," doc. IEEE 802.11-15/0132r12, vol. 802.11ax, No. 12, 38 pages (Dec. 1, 2015).

Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, pp. 207-211 (2009).

Taghavi et al., "Introductory Submission for TGah", doc. No. IEEE 802.11-11/0062r0, *Institute for Electrical and Electronics Engineers*, pp. 1-5 (Jan. 14, 2011).

van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).

Vermani et al. "Preamble Format for 1 MHz," *The Institute of Electrical and Electronics Engineers*, doc. No. IEEE 802.11-11/1482r2, pp. 1-30 (Nov. 2011).

Vermani et al. "Spec Framework Text for PHY Numerology," *The Institute of Electrical and Electronics Engineers*, doc. No. IEEE 802.11-11/1311r0, pp. 1-5 (Sep. 2011).

Wannstrom, "Carrier Aggregation explained," pp. 1-6 (May 2012).

Yu et al., "Coverage extension for IEEE802.11ah," *The Institute of Electrical and Electronics Engineers*, doc. No. IEEE 802.11-11/0035r1, pp. 1-10 (Jan. 2011).

Zhang et al., "11ac Explicit Sounding and Feedback", *The Institute of Electrical and Electronics Engineers*, doc. No. IEEE 802.11-10/1105r0, 44 pages (Sep. 2010).

Zhang et al., "11ah Data Transmission Flow," *The Institute of Electrical and Electronics Engineers*, doc. No. IEEE 802.11-11/1484r1, pp. 1-15 (Nov. 2011).

Zhang et al., "1MHz Waveform in Wider BW", *The Institute of Electrical and Electronics Engineers*, doc. No. IEEE 802.11-12/0309r1, pp. 1-10 (Mar. 2012).

Zhang et al., "Beamforming Feedback for Single Stream," *The Institute of Electrical and Electronics Engineers*, doc. No. IEEE 802.11-12/1312r0, pp. 1-22 (Nov. 12, 2012).

Zhang et al., "VHT Link Adaptations," doc. No. IEEE802.11-11/0047r0, IEEE 802.11-11, 125th IEEE 802.11 Wireless Local Area Networks Session, Interim Meeting Session, Hyatt Century Plaza Hotel, Los Angeles, California, pp. 1-11 (Jan. 18, 2011).

IEEE P802.11ah™/D1.3 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-466 (Apr. 2014).

Asterjadhi et al., "HE A-Control field," IEEE Draft, IEEE 802.11-15/1121r0 Draft, vol. 802.11ax, 18 pages (Sep. 12, 2015).

Lv et al., "UL MU CCA Response," IEEE Draft, 802.11-16/0054r1, vol. 802.11ax, No. 1, 14 pages (Jan. 18, 2016).

International Preliminary Report on Patentability in International Patent Application No. PCT/US2017/027608, dated Oct. 25, 2018 (10 pages).

\* cited by examiner

DETERMINING CHANNEL AVAILABILITY FOR ORTHOGONAL FREQUENCY DIVISION MULTIPLE ACCESS OPERATION

CROSS-REFERENCES TO RELATED APPLICATIONS

This application claims the benefit of U.S. Provisional Application. Ser. No. 62/322,702, filed Apr. 14, 2016, entitled "Available Channel Polling for OFDMA Operation," which is hereby incorporated by reference herein in its entirety.

FIELD OF THE DISCLOSURE

The present disclosure relates generally to communication networks and, more particularly, to multi-user transmission in wireless local area networks (WLAN).

BACKGROUND

Wireless local area network (WLAN) technology has evolved rapidly over the past two decades. Development of WLAN standards such as the Institute for Electrical and Electronics Engineers (IEEE) 802.11a, 802.11b, 802.11g, 802.11n, and 802.11ac Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method includes: receiving, at a first communication device, a first data unit from a second communication device via one or more communication channels, wherein the first data unit includes an indication of a first set of one or more sub-channels allocated to the first communication device, and wherein the first data unit is configured to prompt the first communication device to transmit channel availability information as part of a subsequent orthogonal frequency division multiple access (OFDMA) transmission. The method also includes: determining, at the first communication device, channel availability information for the one or more communication channels; and when the first communication device determines that at least one of the communication channels among the one or more communication channels is idle, transmitting, by the first communication device, a second data unit to the second communication device as part of the OFDMA transmission, wherein the second data unit includes the channel availability information, and wherein the second data unit is transmitted in one or more allocated sub-channels, among the first set of one or more sub-channels allocated to the first communication device.

In another embodiment, an apparatus comprises a network interface device associated with a first communication device, wherein the network interface device is implemented using one or more integrated circuits (ICs). The one or more ICs are configured to: receive, from a second communication device, a first data unit via one or more communication channels, wherein the first data unit includes an indication of a first set of one or more sub-channels allocated to the first communication device, and wherein the first data unit is configured to prompt the first communication device to transmit channel availability information as part of a subsequent orthogonal frequency division multiple access (OFDMA) transmission; determine channel availability information for the one or more communication channels; and when the network interface device determines that at least one of the communication channels among the one or more communication channels is idle, transmit a second data unit to the second communication device as part of the OFDMA transmission, wherein the second data unit includes the channel availability information, and wherein the second data unit is transmitted in one or more allocated sub-channels, among the first set of one or more sub-channels allocated to the first communication device.

In yet another embodiment, a method for communication between a first communication device and a plurality of second communication devices via one or more communication channels includes: allocating, at the first communication device, a plurality of sub-channels, among the one or more communication channels, to the plurality of second communication devices to generate first allocation information that indicates a first allocation of the plurality of sub-channels to the plurality of second communication devices; generating, at the first communication device, a first physical layer (PHY) data unit that includes the first allocation information, wherein the first PHY data unit also includes information configured to prompt the plurality of second communication devices to provide channel availability information in response to the first PHY data unit; transmitting, by the first communication device, the first PHY data unit to the plurality of second communication devices via the one or more communication channels; receiving, at the first communication device, first uplink orthogonal frequency division multiple access (OFDMA) transmissions from at least some second communication devices in the plurality of second communication devices in response to the first PHY data unit, wherein the first uplink OFDMA transmissions include respective channel availability information from respective second communication devices; and allocating, at the first communication device, the plurality of sub-channels to the at least some second communication devices using the respective channel availability information to generate second allocation information that indicates a second allocation of the plurality of sub-channels to the at least some second communication devices.

In still another embodiment, an apparatus comprises a network interface device associated with a first communication device, wherein the network interface device is implemented using one or more integrated circuits (ICs). The one or more ICs are configured to: allocate a plurality of sub-channels, among one or more communication channels, to a plurality of second communication devices to generate first allocation information that indicates a first allocation of the plurality of sub-channels to the plurality of second communication devices; generate a first physical layer (PHY) data unit that includes the first allocation information, wherein the first PHY data unit also includes information configured to prompt the plurality of second communication devices to provide channel availability information in response to the first PHY data unit; transmit the first PHY data unit to the plurality of second communication devices via the one or more communication channels; receive first uplink orthogonal frequency division multiple access (OFDMA) transmissions from at least some second communication devices in the plurality of second communication devices in response to the first PHY data unit, wherein the first uplink OFDMA transmissions include respective channel availability information from respective second communication devices; and allocate the plurality of sub-channels to the at least some second communication devices using the respective channel availability information to generate second allocation information that indicates a second allocation of the plurality of sub-channels to the at least some second communication devices.

In another embodiment, a method includes: receiving, at a communication device, a physical layer (PHY) data unit from a second communication device, wherein the PHY data unit indicates one or more sub-channels of one or more communication channels in connection with a subsequent orthogonal frequency division multiple access (OFDMA) transmission to the second communication device; using, at the first communication device, an energy signal level measurement made during a time period prior to reception of the PHY data unit to determine channel availability information; and using, at the communication device, the channel availability information in conjunction with an OFDMA transmission to be performed in response to the PHY data unit.

In yet another embodiment, an apparatus comprises: a network interface device associated with a first communication device, wherein the network interface device is implemented using one or more integrated circuits (ICs). The one or more ICs are configured to: receive a physical layer (PHY) data unit from a second communication device, wherein the PHY data unit indicates one or more sub-channels of one or more communication channels in connection with a subsequent orthogonal frequency division multiple access (OFDMA) transmission to the second communication device; use an energy signal level measurement made during a time period prior to reception of the PHY data unit to determine channel availability information; and use the channel availability information in conjunction with an OFDMA transmission to be performed in response to the PHY data unit.

DETAILED DESCRIPTION

In embodiments described below, a wireless network device such as an access point (AP) of a wireless local area network (WLAN) transmits a trigger frame to prompt multiple client stations to transmit simultaneously as part of an orthogonal frequency division multiple access (OFDMA) transmission via a communication channel. To facilitate efficient use of the communication channel, the AP may first poll the client stations to determine channel availability from the standpoint of the client stations. Based on the results of the polling for channel availability, the AP allocates respective frequency sub-channels to multiple client stations, and transmits the trigger frame to prompt the multiple client stations to transmit via the respective frequency sub-channels as part of an OFDMA transmission.

Figure 1:
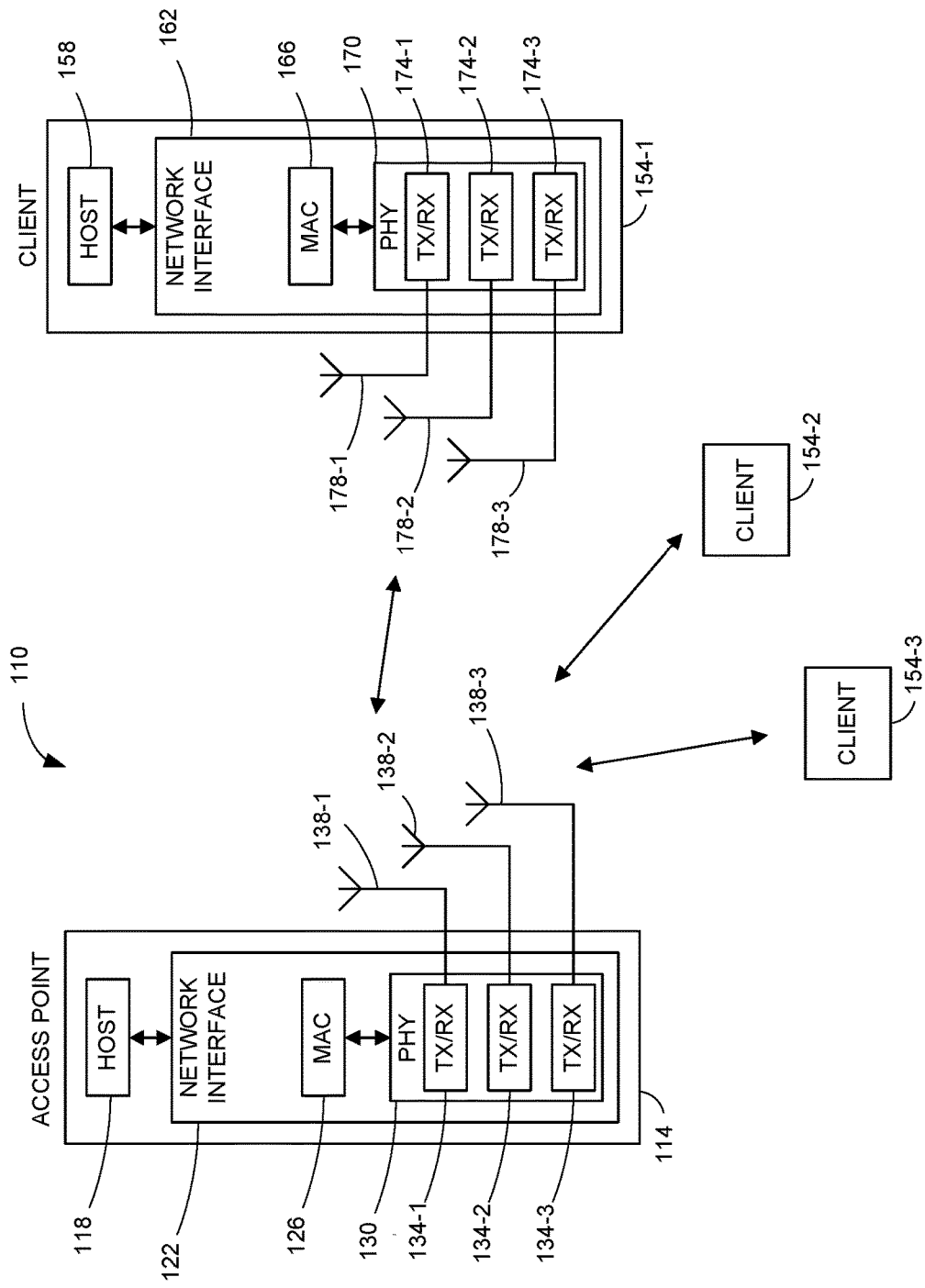
FIG. 1 is a block diagram of an example wireless local area network (WLAN), according to an embodiment.

FIG. 1 is a block diagram of an example WLAN 110, according to an embodiment. The WLAN 110 supports downlink (DL) and uplink (UL) multi-user (MU) communications between an access point (AP) and a plurality of client stations. For example, the WLAN 110 supports DL OFDMA and UL OFDMA communications between multiple client stations and the AP.

The WLAN 110 includes an access point (AP) 114 that comprises a host processor 118 coupled to a network interface device 122. The network interface 122 includes a medium access control layer (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized. The PHY processor 130 includes circuitry, coupled to the antennas 138, that is configured to upconvert baseband signals to radio frequency (RF) signals for transmission via the antennas 138. The PHY processor 130 also includes circuitry, coupled to the antennas 138, that is configured to downconvert RF signals received via the antennas 138 to baseband signals. Such upconvert and downconvert circuitry may be included, at least partially, in the transceivers 134, in some embodiments.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard (including future versions of the IEEE 802.11 Standard) or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. The PHY processor 130 may be configured to cause the AP 114 to transmit a signal by providing a baseband signal that includes a PPDU to the circuitry configured to upconvert baseband signals to RF signals. The circuitry configured to upconvert baseband signals to RF signals responsively provides the RF signal that includes the PPDU to the antennas 138.

Similarly, the PHY processor 130 may be configured to receive PHY data units that were received via the antennas 138, and extract MAC layer data units encapsulated within the PHY data units. For example, the circuitry configured to downconvert RF signals to baseband signals may output a baseband signal that includes a received PPDU, and the PHY processor 130 may extract one or more MAC layer data units encapsulated in the PPDU. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized. The PHY processor 170 includes circuitry, coupled to the antennas 178, that is configured to upconvert baseband signals to RF signals for transmission via the antennas 178. The PHY processor 170 also includes circuitry, coupled to the antennas 178, that is configured to downconvert RF signals received via the antennas 178 to baseband signals. Such upconvert and downconvert circuitry may be included, at least partially, in the transceivers 174, in some embodiments.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol (e.g., in its current form or as amended in the future) or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. The PHY processor 170 may be configured to cause the client station 154-1 to transmit a signal by providing a baseband signal that includes a PPDU to the circuitry configured to upconvert baseband signals to RF signals. The circuitry configured to upconvert baseband signals to RF signals responsively provides the RF signal that includes the PPDU to the antennas 178.

Similarly, the PHY processor 170 may be configured to receive PHY data units that were received via the antennas 178, and extract MAC layer data units encapsulated within the PHY data units. For example, the circuitry configured to downconvert RF signals to baseband signals may output a baseband signal that includes a received PPDU, and the PHY processor 170 may extract one or more MAC layer data units encapsulated in the PPDU. The PHY processor 170 may provide the extracted MAC layer data units to the MAC processor 166, which processes the MAC layer data units.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
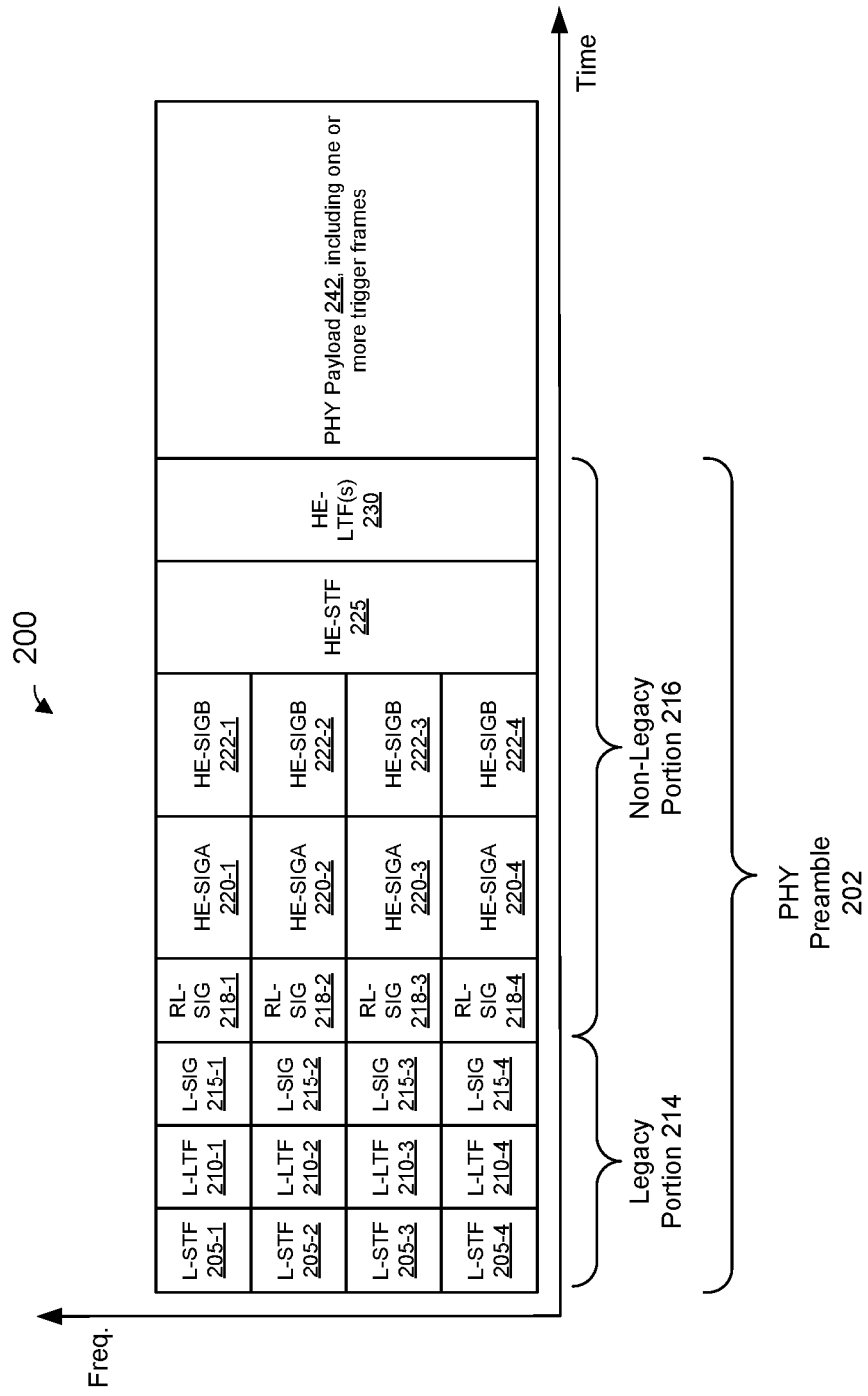
FIG. 2A is a block diagram of an example downlink (DL) orthogonal frequency division multiple access (OFDMA) PHY data unit, according to an embodiment.

FIG. 2A is a diagram of a DL OFDMA PHY data unit 250 that the network interface 122 (FIG. 1) is configured to transmit to multiple client stations 154, according to an embodiment. The PHY data unit 200 may occupy a composite channel bandwidth, for example an 80 MHz channel bandwidth. Data units similar to the data unit 200 occupy other suitable bandwidth such as 2 MHz, 4 MHz, 8 MHz, 10 MHz, 20 MHz, 40 MHz, 160 MHz, 320 MHz, 640 MHz, for example, or other suitable bandwidths, in other embodiments.

Available OFDM tones (e.g., OFDM tones that are not used as DC tones, guard tones, etc.) are allocated among multiple blocks that each correspond to a respective one of the (or more, e.g., if also using MU-MIMO) client stations 154 for transmission of data to the client stations 154.

The PHY data unit 200 includes a PHY preamble 202 and a PHY payload 240. The PHY preamble 202 includes a legacy portion 214 and a non-legacy portion 216. In some embodiments, the non-legacy portion 216 corresponds to a communication protocol referred to as a high efficiency (HE) protocol (sometimes also referred to as the IEEE 802.11ax Standard, which is now under development).

The legacy portion 214 includes legacy short training fields (L-STFs) 205, legacy long training fields (L-LTFs) 210, and legacy signal fields (L-SIGs) 215. The non-legacy portion 216 includes repeated L-SIGs (RL-SIGs) 218, HE signal fields (HE-SIGAs) 220, an HE short training field (HE-STF) 225, one or more HE long training fields (HE-LTF(s)) 230. Each of the L-STF 205, the L-LTF 210, and the L-SIG 215, the RL-SIG 218, HE-SIG-A 220, the HE-STF 225, and the M HE-LTFs 230 comprises one or more orthogonal frequency division multiplexing (OFDM) symbols.

In the embodiment of FIG. 2A, the PHY data unit 200 includes one of each of the L-STF 205, the L-LTF 210, the L-SIG 215, RL-SIG 218 the HE-SIG-A 220, in each of a plurality of component channels. In an embodiment, each component channel occupies a bandwidth of 20 MHz. In other embodiments, each component channel occupies another suitable bandwidth (e.g., 1 MHz, 2 MHz, 5 MHz, 10 MHz, etc.).

The legacy portion 214 includes L-STFs 205, L-LTFs 210, and L-SIGs 215. The HE portion 216 includes RL-SIGs 218, HE-SIGAs 220, HE-SIGBs 222, HE-STF 225, one or more HE-LTF(s) 230. Each of the L-STF 205, the L-LTF 210, and the L-SIG 215, the RL-SIG 218, HE-SIG-A 220, the HE-SIG-B 232, the HE-STF 225, and the M HE-LTFs 230 comprises one or more OFDM symbols.

More specifically, in an embodiment, each HE-SIG-A 220 spans an individual component channel and is duplicated in other individual component channels. For example, in an embodiment, each HE-SIGA 220 spans an individual 20 MHz component channel and is duplicated in other individual 20 MHz component channels. In other embodiments, respective HE-SIGAs 220 in respective individual channels are not duplicates but rather may include different information. In an embodiment, respective HE-SIGBs 222 span respective individual component channels similar to the HE-SIGAs 220. In some embodiments, at least one of the HE-SIGBs 222 includes different information than another HE-SIGB 222.

In an embodiment, each of the HE-SIG-A 220 and the HE-SIG-B 222 generally carries information about the format of the PHY data unit 250, such as information needed to properly decode at least a portion of the PHY data unit 250, in an embodiment. In an embodiment, HE-SIG-A 220 carries information commonly needed by multiple intended receivers of the PHY data unit 250. In some embodiments, HE-SIG-A 220 additionally includes information for client stations 154 that are not intended receivers of the PHY data unit 250, such as information needed for medium protection from the client stations 154 that are not receivers of the PHY data unit 250. On the other hand, HE-SIG-B 222 carries user-specific information individually needed by each client station 154 that is an intended recipient of the PHY data unit 250, in an embodiment. In an embodiment, HE-SIG-A 220 includes information needed to properly decode HE-SIG-B 222, and HE-SIG-B 222 includes information needed to properly decode data streams in the PHY data portion 208 of the PHY data unit 250. In some embodiments and/or scenarios, however, HE-SIG-A 220 includes at least some of the information needed to decode the data portion 208, and HE-SIG-B 222 is omitted from the PHY data unit 250 in at least some such embodiments.

Each of the HE-STF 225 and the HE-LTF(s) 230 span the composite communication channel, in an embodiment.

In some embodiments and/or scenarios, the preamble 204 omits one or more of the fields 205-230. For example, the preamble 204 omits one or more of the HE-SIG-A 220 and the HE-SIG-B 222, in an embodiment. In some embodiments, the preamble 204 includes additional fields not illustrated in FIG. 2A. In some embodiments, the order of fields in the preamble 204 is different than illustrated in FIG. 2A.

In an embodiment, the PHY payload 242 of the PHY data unit 250 includes one or more trigger frames configured to prompt an UL OFDMA transmission from multiple client stations.

Figure 2B:
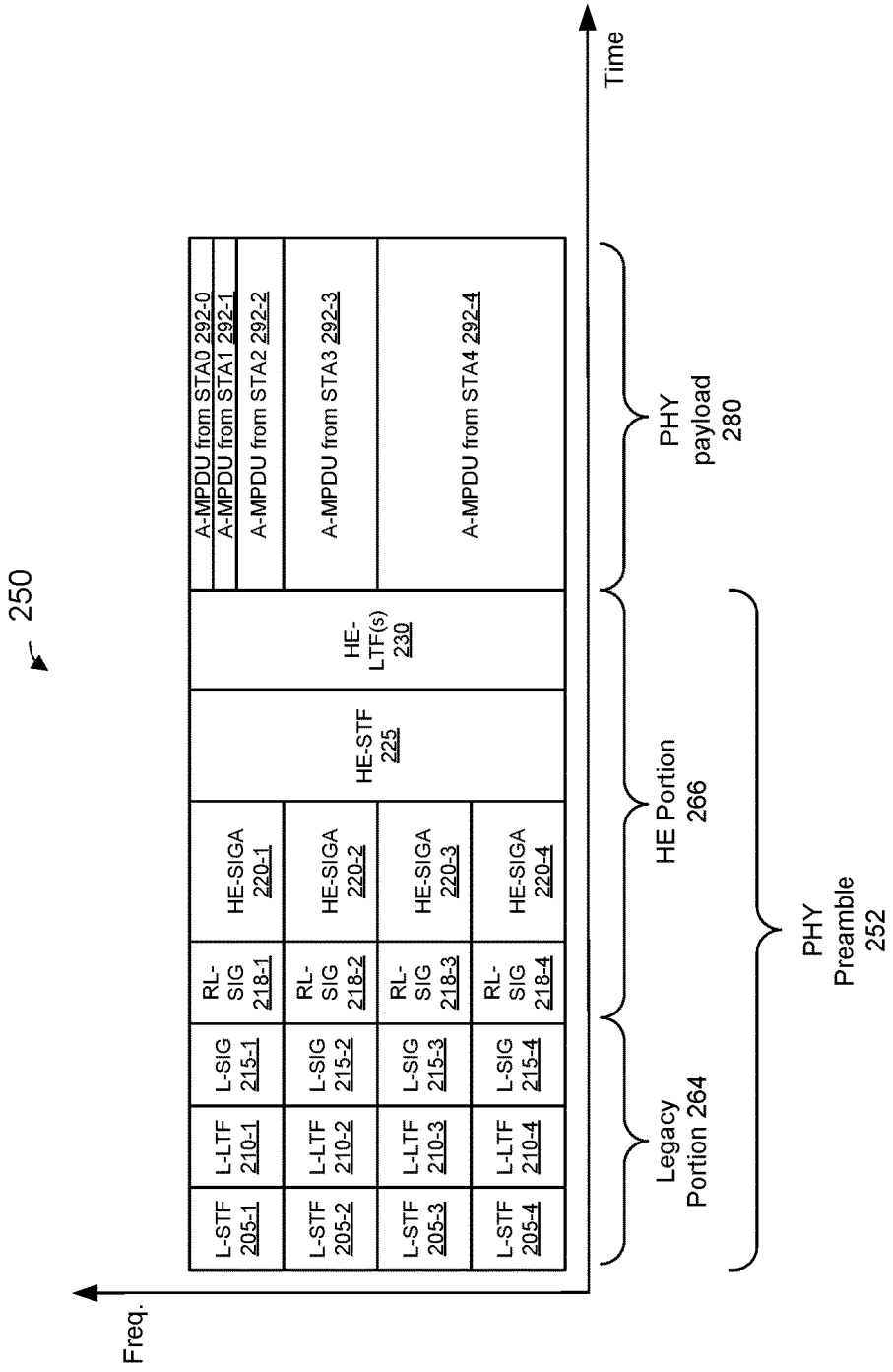
FIG. 2B is a block diagram of an example uplink (UL) OFDMA PHY data unit, according to an embodiment.

FIG. 2B is a diagram of an UL OFDMA PHY data unit 250 that network interfaces (e.g., the network interface 162 (FIG. 1)) in multiple client stations 154 are configured to transmit to the AP 114, according to an embodiment. The PHY data unit 250 may occupy a channel bandwidth of 80 MHz, for example. Data units similar to the data unit 250 occupy other suitable bandwidths such as 2 MHz, 4 MHz, 8 MHz, 10 MHz, 20 MHz, 40 MHz, 80 MHz, 160 MHz, 320 MHz, 640 MHz, for example, or other suitable bandwidths, in other embodiments.

The PHY data unit 250 includes independent data streams that are transmitted from multiple client stations 154 using respective sets of OFDM tones allocated to the client stations 154. For example, in an embodiment, available OFDM tones (e.g., OFDM tones that are not used as DC tones, guard tones, etc.) are allocated among multiple resource units (RUs) that each correspond to a respective one of the (or more, e.g., if also using MU-MIMO) client stations 154 for transmission of data to, or by, the one or more of the client stations 25. In embodiments, each RU corresponds to a respective set of OFDM tones within the communication channel.

The PHY data unit 250 includes a PHY preamble 252 and a PHY payload 280. The PHY preamble 252 includes a legacy portion 264 and a non-legacy HE portion 266. The PHY preamble 252 is similar to the PHY preamble 202 of FIG. 2A and is not described in detail for reasons of brevity. In an embodiment, the PHY preamble 252 omits the HE-SIGBs 222 that are included in the PHY preamble 202 of FIG. 2A.

In an embodiment, the PHY payload 280 of the PHY data unit 250 includes a plurality of A-MPDUs 292 respectively transmitted by ones of multiple client stations 154. In an embodiment, at least some of the A-MPDUs 292 in the PHY data portion 208 occupy sub-channels that span a bandwidth smaller than a component channel bandwidth. In an embodiment, at least some of the A-MPDUs 212 in the PHY data portion 208 occupy channels that span one or more RUs.

Figure 3:
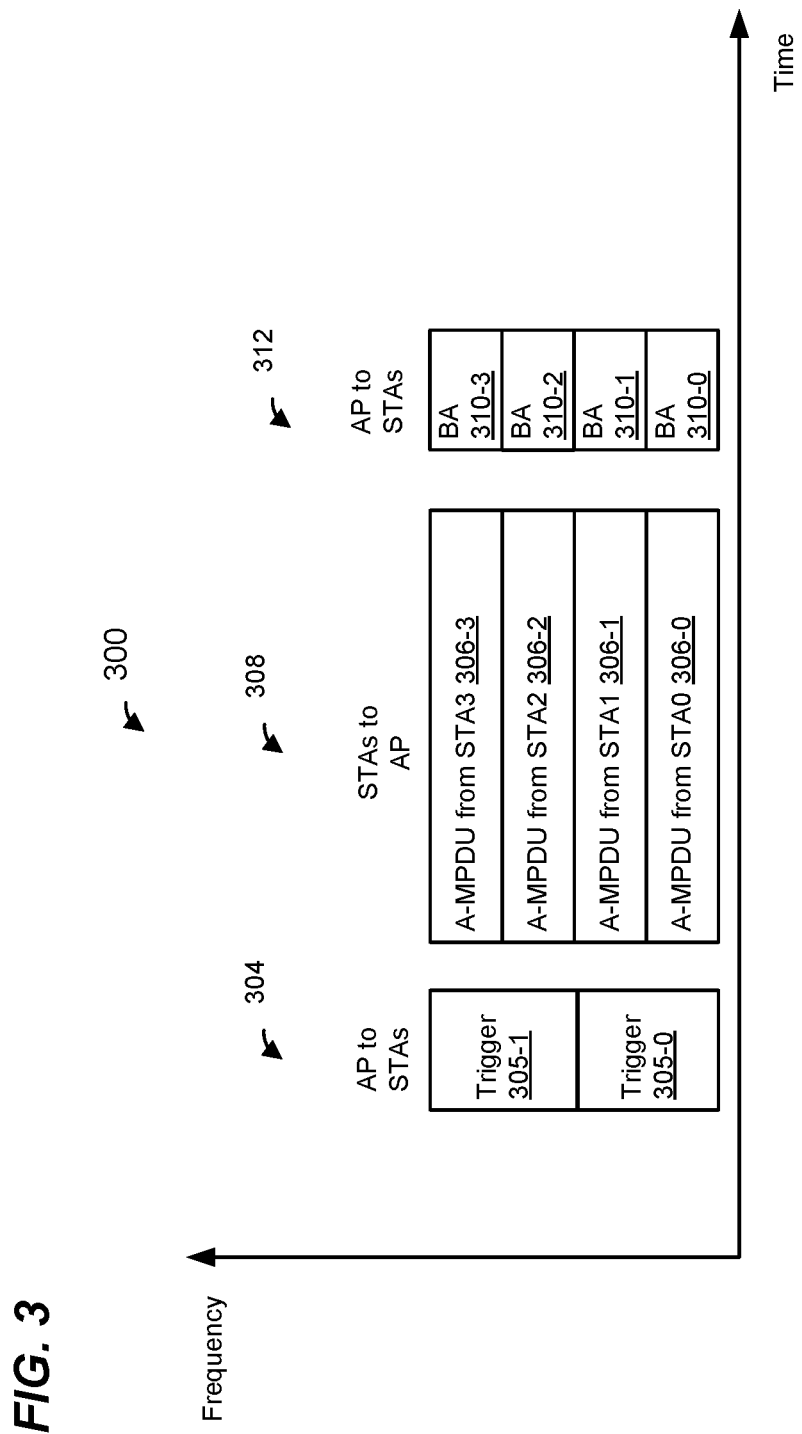
FIG. 3 is a diagram of an example frame exchange corresponding to an UL OFDMA transmission, according to an embodiment.

FIG. 3 is a diagram of an example transmission sequence 300 including trigger frames within a DL non-HT duplicate PHY data unit 304 followed by an UL OFDMA PHY transmission 308, according to an embodiment. In an embodiment, the DL PHY data unit 304 comprises of one or more trigger frames 305 that provide, to the plurality client stations 154, resource unit allocation information and/or other transmission parameters corresponding to the subsequent UL OFDMA PHY transmission 308. In other embodiments, the PHY data unit 304 is an HT SU PHY data unit, a VHT SU PHY data unit, an HE SU PHY data unit, etc. In another embodiment, the PHY data unit 304 is a DL MU PHY data unit 304.

In response to the DL PHY data unit 304, each client station 154 participating in the UL OFDMA transmission begins transmitting as part of the UL OFDMA PHY data transmission 308. In an embodiment, transmission of the UL OFDMA PHY transmission 308 begins upon expiration of a suitable predetermined time interval (e.g., a short interframe space (SIFS)) after completion of reception of the DL PHY data unit 304 at the client stations 154. In another embodiment, a suitable predetermined time period other than SIFS is utilized.

The client stations 154 (STA0-STA3) each transmit as part of the UL OFDMA PHY data unit 308, wherein the UL OFDMA PHY transmission 308 includes aggregate MPDUs (A-MPDUs) 306 from respective stations 154. In an embodiment, each client station transmits a respective A-MPDU 306 using transmission parameters, such as a modulation and coding scheme, a coding type, transmission power, length or duration of the data unit, etc., indicated in one or more of the trigger frames 305. In another embodiment, at least some of the client stations transmit A-MPDUs 306 using at least some transmission parameters, such as a modulation and coding scheme, a coding type, transmission power, length or duration of the data unit, etc., determined by the client stations and not indicated in the trigger frames 305.

Next, the AP transmits a DL MU PHY data unit 312, according to an embodiment. In an embodiment, the PHY data unit 312 includes respective block acknowledgement (BA) frames 310 to the client stations 154 (STA0 through STA3), acknowledging receipt of the A-MPDUs 306 from the client stations 154. In another embodiment, the transmission 312 is a single user (SU) or broadcast transmission duplicated in multiple channels (e.g., component channels).

While FIG. 3 shows an example transmission sequence involving four client stations 154 (STA0-STA3), in other embodiments, a different number of client stations (e.g., 2, 3, 5, 6, etc.) are involved.

In an embodiment, to minimize signal collision in the WLAN 110, an AP 114 or a client station 154 assesses the availability of a communication channel (e.g., one or more component channels, or one or more RUs) prior to a transmission from the AP 114 or the client station 154. In an embodiment, availability of a communication channel is assessed using a clear channel assessment (CCA) mechanism. In an embodiment, the CCA mechanism involves measuring signal power in a communication channel and determining when the communication channel is "busy" or "idle" based on the measured signal power.

Before transmitting the trigger frames 305, the AP 114 may perform a CCA procedure, and may use results of the CCA procedure to determine whether particular component communication channels are idle for the purpose of the client stations 154 later transmitting as part of the UL OFDMA PHY data unit 308. Although a particular component channel may appear idle to the AP 1:14, however, the component channel may be busy from the standpoint of a particular client station 154 because the client station 154 is closer to an interference source (e.g., a communication device from a neighboring WLAN) than the AP 114. Thus, the AP 114 may allocate one or more RUs to a particular client station 154 for the UL OFDMA PHY data unit 308, but the client station 154 will not transmit as part of the UL OFDMA PHY data unit 308 because the client station 154 determines that a component channel is busy. Thus, the channel medium is underutilized.

A client station 154 may not respond to the trigger frame 305 if the client station 154 detects, through CCA, that an RU, or a component channel including the RU, allocated to the client station 154 is busy. As a result, the available bandwidth is not fully utilized for the UL OFDMA transmission 308. For instance, if client station STA3 determines, using CCA, that the component channel 330-1 is not available, the client station STA3 does not transmit A-MPDU 306-3. In such a scenario, available bandwidth in the component channel 330-1, which could otherwise have been used for an UL transmission from a different client station, is left unused. Additionally, the AP 114 may need to transmit another trigger frame to solicit a subsequent UL OFDMA transmission from the client station 154 that did not respond to the trigger frame 305. These factors lead to a loss in efficiency of communication.

Figure 4A:
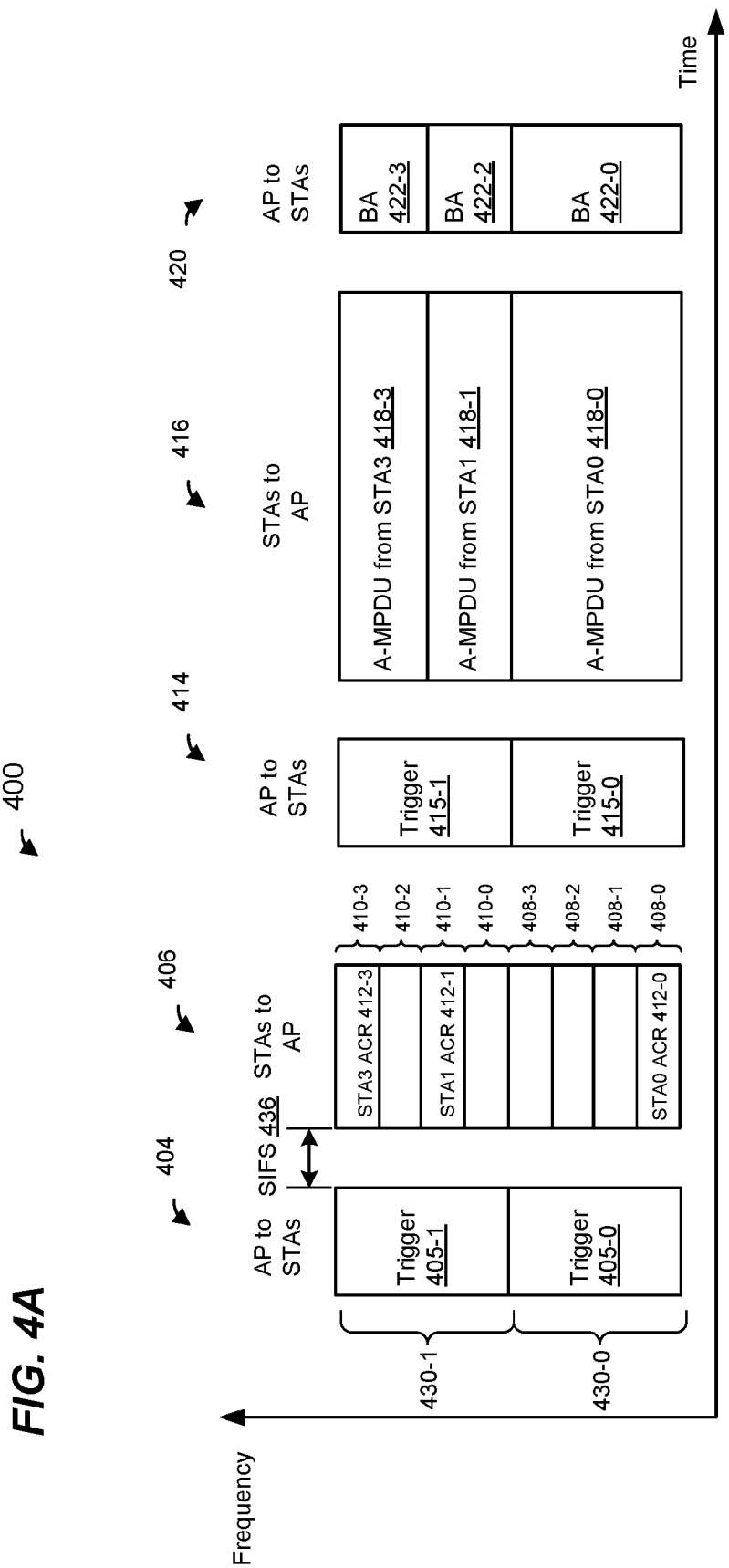
FIG. 4A is a timing diagram of another example frame exchange corresponding to an UL OFDMA transmission, according to an embodiment.

FIG. 4A is a diagram of an example transmission sequence 400 in a WLAN, such as the WLAN 110 of FIG. 1, according to an embodiment. In the example illustrated in FIG. 4A, an AP, such as the AP 114, triggers multiple UL OFDMA transmissions by multiple client stations, such as multiple ones of the client stations 154. In the transmission sequence 400, the AP 114 first prompts multiple client stations to report channel availability via a first UL OFDMA transmission 406. The AP 114 then uses channel availability information, provided via the first UL OFDMA transmission 406, to determine an RU allocation for a second UL OFDMA transmission 416. Use of the channel availability information, provided via the first UL OFDMA transmission 406, reduces a chance that the AP will allocate an RU to a client station that from the standpoint of the AP is idle, but from the standpoint of the client station 154 is busy.

The AP 114 transmits a DL non-HT duplicate PHY transmission 404 to a plurality of client stations 154 (e.g. STA0-STA3). In an embodiment, the DL PHY transmission 404 comprises of one or more trigger frames 405 that provide, to the plurality of client stations 154, RU allocation information and/or other transmission parameters corresponding to the subsequent UL OFDMA transmission 406. In an embodiment, the trigger frames 405 are configured to prompt multiple client stations 154 to report channel availability information (e.g., whether a communication channel is idle or busy from the standpoint of the client station) as part of the UL OFDMA transmission 406. The trigger frames 405 are sometimes referred to herein as "available channel polling" trigger frames.

In an embodiment, the trigger frames 405 correspond to broadcast trigger frames. In an embodiment, each trigger frame transmission 405 spans an individual component channel and the trigger frame transmission 405 is duplicated in one or more other individual component channels. For example, in an embodiment, the trigger frame transmission 405-0 spans a component channel 430-0 and is duplicated to generate a trigger frame transmission 405-1 in another component channel 430-1. In other embodiments, the trigger frames 405 comprise multiple different trigger frames.

In an embodiment, the trigger frames 405 provide RU allocation information that indicates, to the client stations 154, allocated RUs to be used by the client stations 154 during the subsequent UL OFDMA transmission 406. For example, the trigger frames 405 include RU allocation information. As another example, the RU allocation information is included in a PHY preamble (e.g., in HE-SIGB fields) corresponding to the DL OFDMA transmission 404.

In an embodiment, the AP 114 allocates one or more RUs in each of multiple component channels 430 to each of multiple client stations 154. For example, in the example of FIG. 4A, the AP 114 allocates RU 408-0 in component channel 430-0 and RU 410-0 in component channel 430-1 to STA0. Similarly, the AP 114 allocates RU 408-1 in component channel 430-0 and RU 410-1 in component channel 430-1 to STA1. The remaining client stations 154 (e.g., STA2, STA3) are similarly allocated respective RUs in the component channels 430-0 and 430-1.

The AP 114 includes the above RU allocation in trigger frame transmissions 405 (e.g., in the trigger frames 405 themselves and/or in HE-SIGB fields in PHY preambles corresponding to the trigger frames 405).

Availability of channels for a future UL OFDMA transmission is assessed by multiple client stations 154 in connection with receipt of the trigger frames 405 by the multiple client stations 154. In an embodiment, each client station 154 uses CCA techniques described above to determine communication channels (e.g., component communication channels) that are available, as observed by the client station 154. For instance, in an embodiment, a client station 154 determines which of the component channels 430 are available (i.e., idle). Client station 154 then generates information that indicates the determined availability of the component channels from the standpoint of the client station 154. In an embodiment, the determined availability of the component channels from the standpoint of the client station 154 is included in an available channel report (ACR). The ACR may include a bitmap with bits corresponding to a plurality of component channels, where bits corresponding to idle component channels are set to 1 and bits corresponding to busy component channels are set to 0.

In response to the trigger frames 405, multiple client stations 154 transmit as part of the UL OFDMA transmission 406 to the AP 114 to report the determined availability of communication channels. The information indicating the determined availability of the component channels from the standpoint of a particular client station 154 (e.g., an ACR) may be included in a respective PHY data portion of the UL OFDMA transmission 406 corresponding to the client station 154. For example, the client stations 154 may include respective ACRs in respective PHY data portions in respective RUs, according to allocation information in the trigger frames 405. In an embodiment, the UL OFDMA transmission 406 begins upon expiration of a suitable predetermined time interval 436 (e.g., SIFS or another suitable time period) after completion of reception of the DL OFDMA transmission 404 at the client stations 154.

As discussed above, each client station 154 determines whether component channels 430 are available, and may transmit a corresponding ACR in an RU of the component channel 430 that is determined to be available. For instance, the client station STA0 determines that the component channel 430-0 is available, and transmits information that indicates the determined availability of the component channels (e.g., an ACR 412-0), using the RU 408-0, indicating that component channel 430-0 is available as observed by the client station STA0. In an embodiment, the information that indicates the determined availability of the component channels (e.g., the ACR. 412-0) is transmitted in an MPDU (e.g., in a MAC header of the MPDU, in a payload of the MPDU, etc.) via the RU 408-0. In an embodiment, the ACR 412-0 has a format such as described in U.S. Provisional Patent Application No. 62/321,703, entitled "HE Control Field Content," filed on Apr. 12, 2016, which is hereby incorporated by reference herein in its entirety. In other embodiments, the ACR 412-0 has another suitable format.

Similarly, client stations STA1 and STA3 determine that the component channel 430-1 is available and transmit respective ACRs 412-1 and 412-3, using RU 410-1 and RU 410-3, respectively, indicating that the component channel 430-1 is available as observed by the client stations STA1 and STA3. In an embodiment, the client station STA0 determines that both component channels 430-0 and 430-1 are available and transmits ACRs in both RU 408-0 and RU 410-0. In another embodiment, the client station STA0 determines that both component channels 430-0 and 430-1 are available, but transmits only an ACR 412-0 using an RU of only one component channel (e.g., RU 408-0 of the component channel 430-0).

In an embodiment, the client station STA2 determines that neither the component channel 430-0 nor the component channel 430-1, as observed by the client station STA2, is available and refrains from transmitting an ACR. In another embodiment, client station STA2 determines that neither the component channel 430-0 nor the component channel 430-1, as observed by the client station STA2, are available and transmits an ACR indicating that no component channels 430 are available.

The AP 114 receives the UL OFDMA transmission 406 and determines the availability of component channels from the standpoint of each of the client stations 154 using respective ACRs 412. For example, the AP 114 receives ACR 412-0 from the client station STA0 in an RU 408-0 allocated to the client station STA0. The AP 114 then determines, based on the received ACR 412-0, that component channel 430-0 is available at client station STA0. The AP 114 similarly determines, based on respective ACRs 412-1 and 412-3 that component channel 430-1 is available at client stations STA1 and STA3. In an embodiment, the AP 114 also determines that an ACR corresponding to the client station STA2 was not received at the AP 114, and therefore determines that both component channels at client station STA2 are busy and not available.

In an embodiment, the AP 114 determines RU allocation to the client stations 154 based on a determined availability of component channels at the client stations 154. For instance, the AP 114 determines, based on the received ACR 412-0, that component channel 430-0 is available at client station STA0, and allocates one or more RUs in the component channel 430-0 to the client station STA0. Similarly, the AP 114 determines, based on ACRs 412-1 and 412-3 that component channel 430-1 is available at client stations STA1 and STA3, and allocates one or more RUs in the component channel 430-1 to the client stations STA1 and STA3. In an embodiment, available RUs in the component channel 430-1 are distributed between the client stations STA1 and STA3. In an embodiment, the AP 114 does not allocate any RUs to the client station STA2 based on the determination that both component channels at client station STA2 are busy and not available.

Next, the AP 114 transmits a second DL transmission 414 to the plurality of client stations 154 (e.g. STA0-STA3). In an embodiment, the DL transmission 414 comprises of one or more trigger frames 415. The DL transmission 414 provides, to the plurality of client stations 154, RU allocation information determined based on the determined availability of component channels at the client stations 154, as discussed above. For instance, the trigger frames 415, fields within the PHY preamble, etc., within the DL transmission 414 include RU allocation information that allocates RUs in the component channel 430-0 to the client station STA0. The DL transmission 414 also includes RU allocation information that allocates respective RUs in the component channel 430-1 to the client stations STA1 and STA3. In an embodiment, the trigger frames 415 are similar to the trigger frames 405, but the trigger frames 415 are not available channel polling trigger frames, e.g., the trigger frames 415 are not configured to prompt multiple client stations 154 to report channel availability information as part of the UL OFDMA transmission 420.

In response to the trigger frames 415, client stations 154 transmit an UL OFDMA transmission 416, wherein the UL OFDMA transmission 416 includes A-MPDUs 418 from respective stations 154. In an embodiment, each client station 154 participating in the transmission 416 transmits a corresponding A-MPDU 418 in a respective one or more RUs allocated to the client station 154, as indicated in the transmission 414. For instance, client station STA0 transmits corresponding A-MPDU 418-0 in RUs in the component channel 430-0 allocated to the client station STA0. Similarly, client stations STA1 and STA3 transmit corresponding A-MPDUs 418-1 and 418-3 in respective RUs in component channel 430-1. Because no RUs were allocated to the client station STA2, client station STA2 does not transmit an A-MPDU in the UL OFDMA transmission 416.

In response to the UL OFDMA transmission 416, the AP transmits a DL transmission 420 to acknowledge receipt of A-MPDUs 418, according to an embodiment. In an embodiment, the DL transmission 420 is a DL OFDMA transmission that includes respective block acknowledgement (BA) frames 422 to the client stations 154 (STA0, STA1, and STA3) acknowledging receipt of respective A-MPDUs 418 from the client stations 154. In other embodiments, the DL transmission 420 is a non-HT (duplicate) SU PPDU, an HT SU PPDU, a VHT SU PPDU, an HE SU PPDU, etc., which includes a broadcast multiuser BA (M-BA).

While FIG. 4A shows an example transmission sequence involving four client stations 154 (STA0-STA3), in other embodiments, a different number of client stations (e.g., 2, 3, 5, 6, etc.) are involved. Further, while FIG. 4 shows an example transmission sequence involving two component channels 430, in other embodiments, a different number of component channels (e.g., 1, 4, 8, 16, etc.) are involved.

Figure 4B:
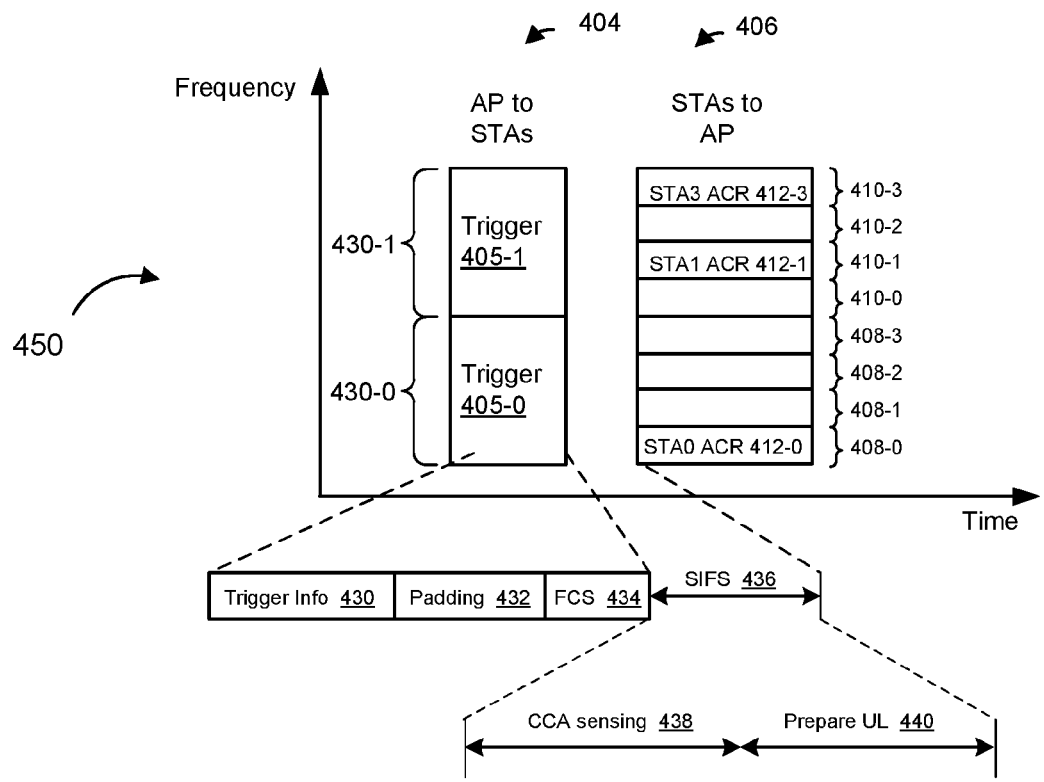
FIG. 4B is a timing diagram showing performance of signal energy measurements during the transmission sequence FIG. 4A, according to an embodiment.

FIG. 4B is a timing diagram 450 showing performance of CCA measurements during the transmission sequence 400 of FIG. 4A, according to an embodiment. Each available channel polling trigger frame 405 in the DL transmission 404 includes a trigger information field 430, optional padding bits 432, and a frame check sequence 434. The trigger information field 430 includes RU allocation information to be used by client stations 154 to report channel availability in the UL OFDMA transmission 406. The padding bits 432 may be added to give client stations 154 additional time to prepare for an UL OFDMA transmission 406, in some embodiments. A frame check sequence (FCS) field 434 provides error detection and/or error correction information for the trigger frame 405.

The client stations 154 transmit the UL OFDMA transmission 406 in conjunction with expiration of the time interval 436. Each client station 154 determines availability of component channels by using CCA techniques during the time interval 436. In an embodiment, the client station 154 measures a signal power level for availability of component channels during a sub-interval 438 within the time interval 436. For example, a client station 154 using CCA measures one or more received RF energy levels in one or more respective component channels 430 during the sub-interval 438 to determine the availability of the one or more component channels. If the RF energy level in the component channel 430-1 is determined to be below a threshold and a network allocation vector (NAV) timer associated with the component channel 430-1 is zero, the client station 154 flags the component channel 430-1 as available. If the RF energy level in the component channel 430-0 is determined to be above a threshold or the NAY timer associated with the component channel 4301 is not zero, the client station 154 flags the component channel 430-0 as busy.

During a sub-interval 440, within the time interval 436, the client station 154 prepares for the UL OFDMA transmission 406. For example, the client stations 154 generate respective MAC data units that include the respective ACRs using the determined component channel availability. After the interval 436 following the trigger frame 405, client stations 154 transmit respective ACRs in the respective allocated RUs, as described above with respect to FIG. 4A.

In some embodiments, however, a length of the timer interval 436 is not sufficient for the client stations 154 to perform CCA and also to prepare a data unit that includes the ACR for the UL OFDMA transmission 406. For instance, in an embodiment, a client station 154 requires an interval of time greater than the allowed interval 440 for preparing the UL OFDMA transmission 406. Thus, in some scenarios, a client station 154 must cut short the sub-interval 438 in order to ensure that the client station 154 can begin transmitting at the end of the time interval 436, which may lead to inaccurate CCA measurements. In some scenarios, the transmission of the UL OFDMA transmission 406 may be delayed as the client station 154 waits until the ACR is ready for transmission, which may degrade the UL OFDMA transmission 406.

Figure 4C:
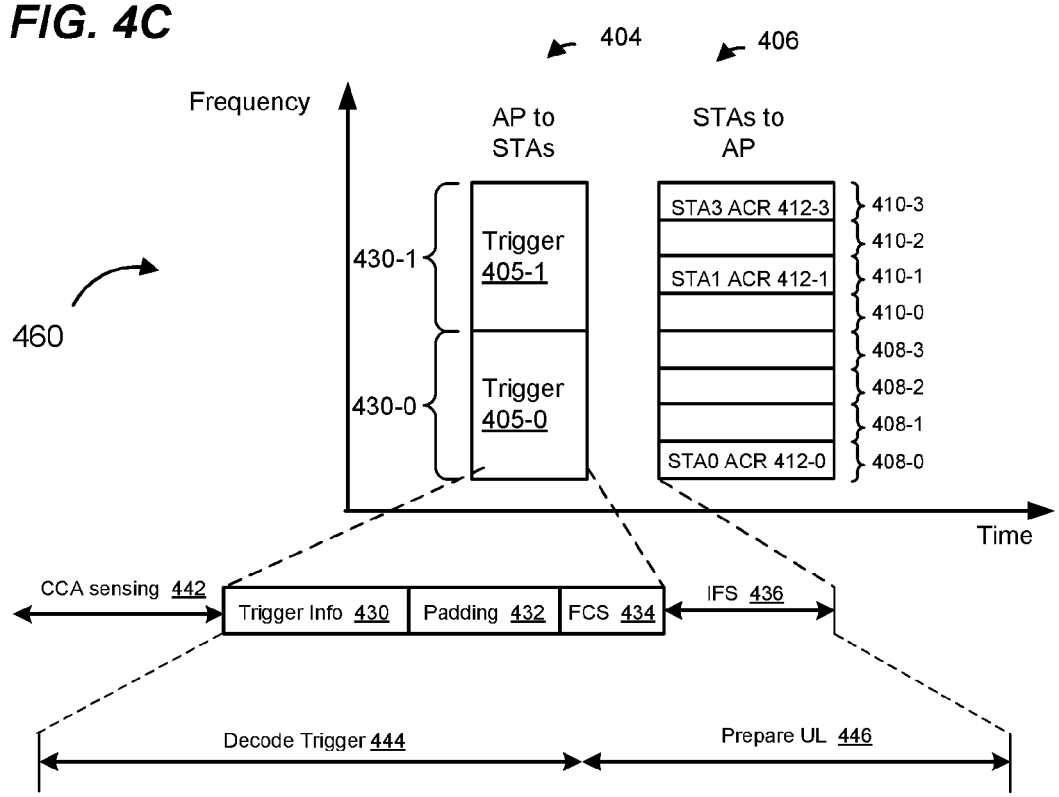
FIG. 4C is a timing diagram showing performance of signal energy measurements during the transmission sequence FIG. 4A, according to another embodiment.

FIG. 4C is a timing diagram 460 showing performance of CCA measurements during the sequence 400 described above with respect to FIG. 4A, according to another embodiment.

In contrast to the CCA measure described above with respect to FIG. 4B, the client stations 154 perform CCA measurements during a time interval 442 that is prior to receiving the DL transmission 404. For example, prior to receiving the trigger frames 405, client stations 154 perform CCA measurements over component channels 430 for a duration of the interval 442. In an embodiment, a duration of the interval 442 is equal to a point coordination function (PCF) inter-frame space (PIFS), as defined by the IEEE 802.11 Standard, or another suitable duration such as SIFS. In an embodiment, client stations 154 continuously monitor and perform CCA over the component channels 430, prior to the reception of the trigger frames 405. For example, a client station 154 continuously measures a received RF energy level in the component channels 430 prior to the reception of the trigger frames 405. After trigger frames 405 are received, the client stations 154 utilize CCA obtained over the duration of the interval 442 immediately prior to the reception of the trigger frames 405 to determine availability of the component channels 430 for a subsequent OFDMA transmission.

The client stations 154 decode the trigger frames 405 during an interval 444 and prepare for the UL OFDMA 406 transmission during the interval 446. For instance, the client stations 154 prepare respective MAC data units that include respective ACRs (generated using the determined availability of component channels 430) for the UL OFDMA transmission 406.

In an embodiment, client stations 154 start preparing for the UL OFDMA 406 even before the DL transmission 404 is completely received at the client stations 154. For example, in an embodiment, the client stations 154 start preparing for the UL OFDMA transmission 406 during the reception of the padding bits 432 or during reception of the FCS 434. In such embodiments, a duration of time that is greater than the time interval 436 is available to the client stations 154 for preparing the UL OFDMA transmission 406.

In an embodiment, performing CCA prior to receiving the DL transmission 404 allows the client stations 154 a greater length of time for performing CCA measurements, and/or preparing the UL OFDMA transmission 406 than is possible in the embodiment described with respect to FIG. 4B.

In an embodiment, performing CCA measurements prior to the reception of trigger frames can also be performed in the context of the transmission sequence 300 of FIG. 3. In an embodiment, the duration of the measurement interval is equal to PIFS, or another suitable duration. In an embodiment, client stations 154 continuously monitor an RU, or a component channel including the RU, and perform CCA measurements prior to the reception of the trigger frames 305. For example, a client station 154 continuously measures a received RF energy level in the component channels 330 prior to the reception of the trigger frames 305. After the trigger frames 305 are received, the client stations 154 utilize the CCA measurements obtained over the duration of the measurement interval immediately prior to the reception of the trigger frames 405 to determine availability of the component channels 330 or RUs within the component channels 330.

In response to the DL transmission 304, a client station 154 will transmit in an RU allocated to the client station 154 only if the client determines, using the CCA measurements performed prior to the DL transmission 304, that a component channel that includes the RU is idle. In some embodiments, performing CCA prior to the DL transmission 304 allows the client stations 154 more time to prepare for the UL OFDMA transmission 308, as compared to the client station 154 performing CCA measurements between the transmissions 304 and 308 (similar to the diagram 450 of FIG. 4B. For example, in an embodiment, client stations 154 can now use an entirety of a SIFS between the DL transmission 304 and the UL transmission 308 for preparing for the UL OFDMA transmission 308.

Figure 5:
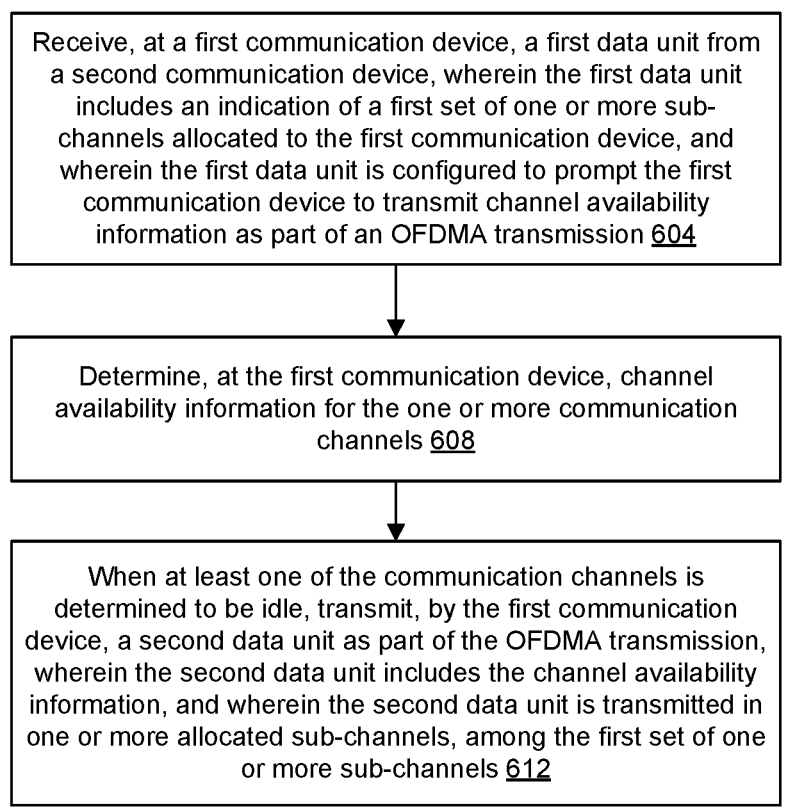
FIG. 5 is a flow diagram of an example method for reporting channel medium availability, according to an embodiment.

FIG. 5 is a flow diagram of an example method 600 of reporting channel medium availability, according to an embodiment. The channel medium availability may be reported for the purpose of allocating channel medium frequency resources for a subsequent UL OFDMA transmission, for example, or for another suitable purpose (e.g., allocating channel medium frequency resources for a subsequent DL OFDMA transmission, selecting a client station for a subsequent UL single-user transmission, selecting a group of client stations for a subsequent UL multi-user multiple input, multiple output (MU MIMO) transmission, etc.). In various embodiments, a network interface device of a first communication device (e.g., the network interface device 162 of the client station 154-1) is configured to implement the method 600. The method 600 is described in the context of the network interface device 162 and FIGS. 4A-4C merely for explanatory purposes and, in other embodiments, the method 600 is implemented by another suitable device and/or in conjunction with other suitable transmission exchanges.

At block 604, a first communication device receives a first data unit via at least one communication channel. The first data unit includes an indication of a first set of one or more sub-channels allocated to the first communication device. For example, the first data unit includes an indication of a first set of one or more sub-channels allocated to the first communication device for a subsequent OFDMA transmission. In an embodiment in which more than one sub-channel is allocated, at least some allocated sub-channels correspond to different communication channels. A sub-channel may correspond to a RU and a communication channel may correspond to a component channel, as described above with respect to FIG. 4A. In an embodiment, the first data unit is a trigger frame, such as the trigger frame 405 or another suitable trigger frame, that is configured to prompt the client station 154 to report, in the subsequent OFDMA transmission, channel availability information corresponding to at least one communication channel.

At block 608, the first communication device determines channel availability information for the one or more communication channels. For example, the first communication device may measure one or more respective energy signal levels for the one or more communication channels and check one or more corresponding NAV timers, and use the one or more respective energy signal levels and the one or more NAV timers to generate the channel availability information for the one or more communication channels. In an embodiment, the first communication device measures one or more respective energy signal levels for the one or more communication channels during a time period after receiving the first data unit. In another embodiment, the first communication device measures one or more respective energy signal levels for the one or more communication channels during a time period prior to receiving the first data unit.

At block 612, when the first communication device determines that at least one of the communication channels among the one or more communication channels is idle, the first communication device transmits a second data unit to the second communication device as part of the OFDMA transmission, where the second data unit includes the channel availability information. In an embodiment, the first communication device determines that a communication is idle when a measured energy level corresponding to the communication channel is below a threshold and a NAV timer corresponding to the communication channel is zero. The second data unit may be transmitted in one or more allocated sub-channels, among the first set of one or more sub-channels allocated to the first communication device. The OFDMA transmission may include multiple simultaneous transmissions from multiple other communication devices (e.g., other client stations).

Figure 6:
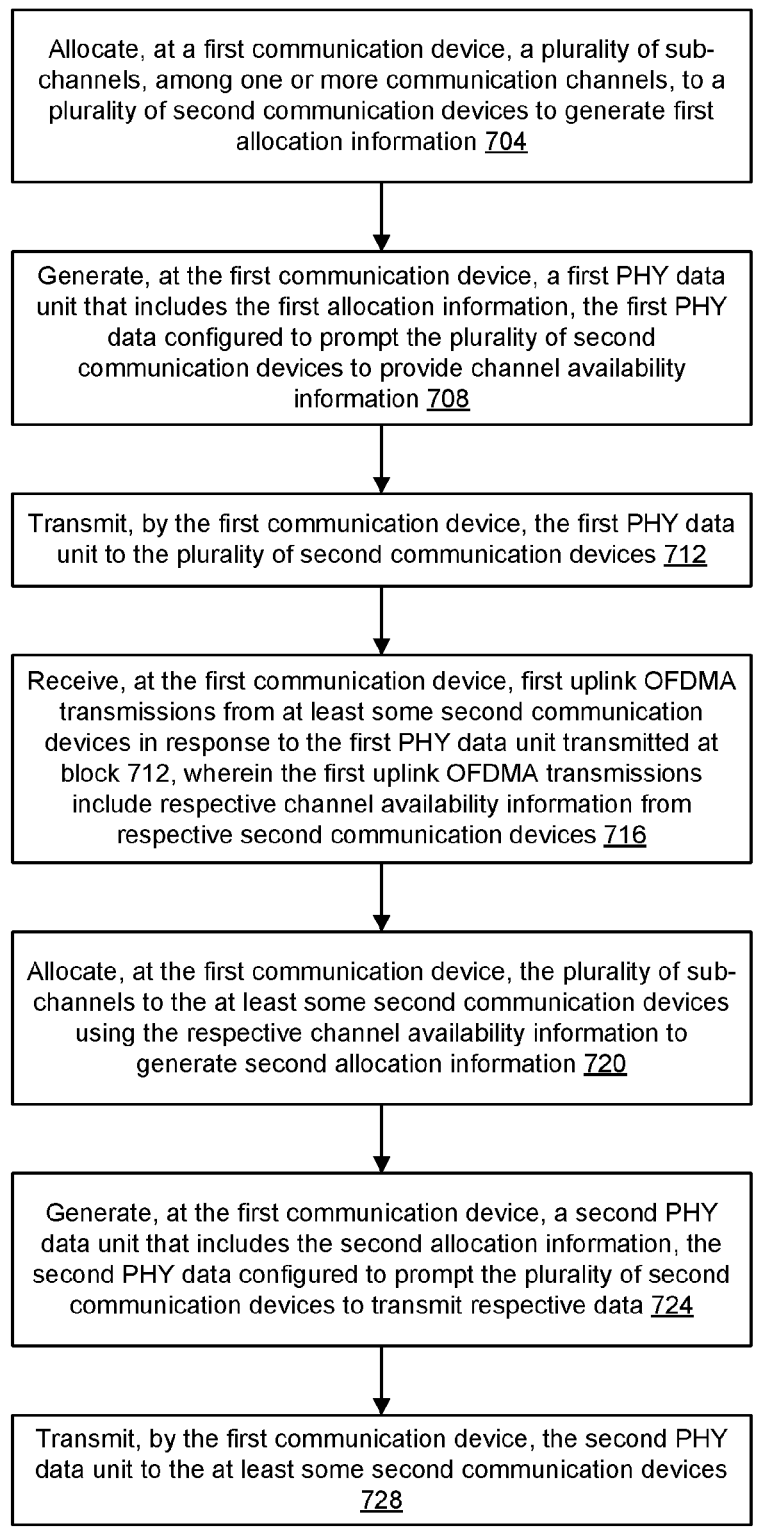
FIG. 6 is a flow diagram of an example method for prompting multiple communication devices for channel availability information, according to an embodiment.

FIG. 6 is a flow diagram of an example method 700 of prompting multiple communication devices for channel availability information, according to an embodiment. In various embodiments, a network interface device of a first communication device (e.g., the network interface device 122 of the AP 114) is configured to implement the method 700. The method 700 is described in the context of the network interface device 122 and FIGS. 4A-4C merely for explanatory purposes and, in other embodiments, the method 700 is implemented by another suitable device and/or in conjunction with other suitable transmission exchanges.

At block 704, a first communication device allocates a plurality of sub-channels, among one or more communication channels, to a plurality of second communication devices to generate first allocation information that indicates a first allocation of the plurality of sub-channels to the plurality of second communication devices. In an embodiment, a sub-channel corresponds to an RU, and a communication channel corresponds to a component channel, as described above with respect to FIG. 4A.

At block 708, the first communication device generates a first PHY data unit that includes the first allocation information. The first PHY data unit may include information configured to prompt the plurality of second communication devices to provide channel availability information in response to the first OFDMA data unit. In an embodiment, the first PHY data unit includes one or more trigger frames the same as or similar to the trigger frame 405 described above with respect to FIG. 4A. In various embodiments, the first PHY data unit is a non-HT duplicate SU PHY data unit, an HT SU PHY data unit, a VHT SU PHY data unit, an HE SU PHY data unit, an HE MU PHY data unit, etc.

At block 712, the first communication device transmits the first PHY data unit generated at block 708 to the plurality of second communication devices via the one or more communication channels.

At block 716, the first communication device receives first uplink OFDMA transmissions from at least some second communication devices in the plurality of second communication devices in response to the first PHY data unit transmitted at block 712. The first uplink OFDMA transmissions may include respective channel availability information from respective second communication devices. For example, the first uplink OFDMA transmissions may include respective MPDUs including respective ACRs. The first uplink OFDMA transmissions are received via a plurality of sub-channels in accordance with the first allocation information transmitted at block 712, in an embodiment.

At block 720, the first communication device allocates the plurality of sub-channels to at least some second communication devices using the respective channel availability information to generate second allocation information that indicates a second allocation of the plurality of sub-channels to the at least some second communication devices.

At block 724, the first communication device generates a second PHY data unit that includes the second allocation information. The second PHY data unit may include information configured to prompt the at least some second communication devices to provide data in response to the second PHY data unit. In an embodiment, the second PHY data unit includes one or more trigger frames the same as or similar to the trigger frame 415 described above with respect to FIG. 4A. In various embodiments, the second PHY data unit is a non-HT duplicate SU PHY data unit, an HT SU PHY data unit, a VHT SU PHY data unit, an HE SU PHY data unit, an HE MU PHY data unit, etc.

At block 728, the first communication device transmits the second PHY data unit generated at block 724 to the at least some second communication devices via the one or more communication channels.

In an embodiment, the first communication device may receive second uplink OFDMA transmissions from the at least some second communication devices in response to the second OFDMA data unit. The second uplink OFDMA transmissions include respective data from respective second communication devices.

Figure 7:
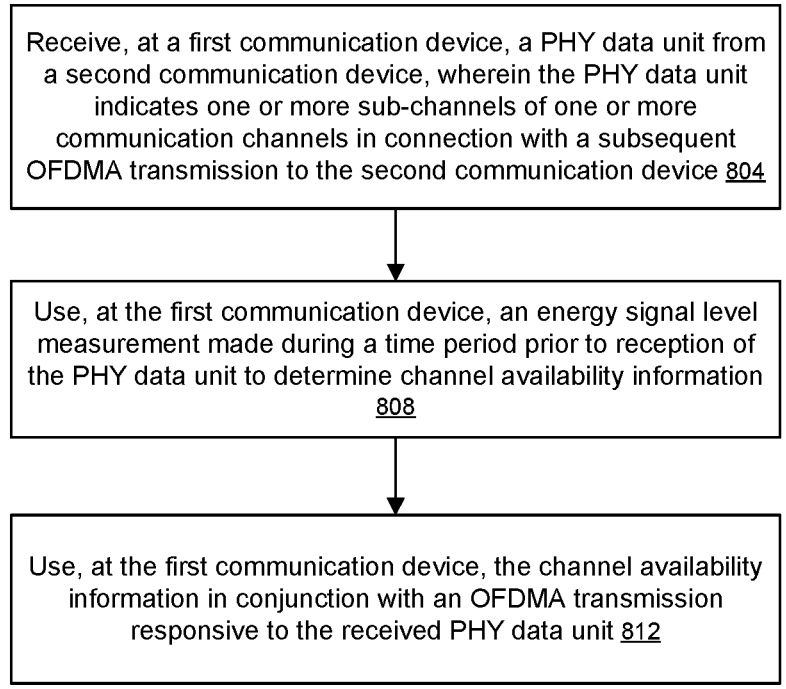
FIG. 7 is a flow diagram of an example method determining and using channel availability for an orthogonal frequency division multiple access (OFDMA) transmission, according to an embodiment.

FIG. 7 is a flow diagram of an example method 800 of determining and using channel availability for an OFDMA transmission, according to an embodiment. In various embodiments, a network interface device 122 and/or a network interface device 162 are configured to implement the method 800. The method 800 is described in the context of the network interface device 162 and the transmission signal exchanges of FIGS. 3, 4A, and 4C merely for explanatory purposes and, in other embodiments, the method 800 is implemented by another suitable device and/or in conjunction with other suitable transmission exchanges.

At block 804, a first communication device receives a PHY data unit from a second communication device. The PHY data unit indicates one or more sub-channels of one or more communication channels in connection with a subsequent OFDMA transmission to the second communication device. In various embodiments, the PHY data unit received at block 804 is a non-HT duplicate SU PHY data unit, an HT SU PHY data unit, a VHT SU PHY data unit, an HE SU PHY data unit, an HE MU PHY data unit, etc.

At block 808, the first communication device uses an energy signal level measurement made during a time period prior to reception of the PHY data unit received at block 804 to determine channel availability information. For example, as discussed above with respect to FIG. 4C, a client station 154 may perform CCA measurements during a time interval 442 that is prior to receiving the DL transmission 404 (or the DL transmission 304 of FIG. 3). The channel availability information is for a subsequent OFDMA transmission by the first communication device, such as the OFDMA transmission 308 (FIG. 3) or the OFDMA transmission 406 (FIGS. 4A and 4C).

At block 812, the first communication device uses the channel availability information in conjunction with an OFDMA transmission to be performed in response to the PHY data unit received at block 804. For example, the first communication device may use the channel availability information to transmit, as part of the OFDMA transmission, in one or more communication channels determined to be idle. As another example, the first communication device may use the channel availability information to transmit determine whether to transmit as part of the OFDMA transmission. As another example, the first communication device may use the channel availability information to determine in which of multiple communication channels to transmit as part of the OFDMA transmission. As yet another example, the first communication device may generate a data unit that includes the channel availability information, and transmit the data unit as part of the OFDMA transmission. In an embodiment, the OFDMA transmission is part of a simultaneous OFDMA transmission from multiple communication devices, including the first communication device, to the second communication device.

In an embodiment, a method includes: receiving, at a first communication device, a first data unit from a second communication device via one or more communication channels, wherein the first data unit includes an indication of a first set of one or more sub-channels allocated to the first communication device, and wherein the first data unit is configured to prompt the first communication device to transmit channel availability information as part of a subsequent orthogonal frequency division multiple access (OFDMA) transmission. The method also includes: determining, at the first communication device, channel availability information for the one or more communication channels; and when the first communication device determines that at least one of the communication channels among the one or more communication channels is idle, transmitting, by the first communication device, a second data unit to the second communication device as part of the OFDMA transmission, wherein the second data unit includes the channel availability information, and wherein the second data unit is transmitted in one or more allocated sub-channels, among the first set of one or more sub-channels allocated to the first communication device.

In other embodiments, the method further includes one of, or any suitable combination of two or more of, the following features.

The first set of one or more sub-channels allocated to the first communication device includes multiple sub-channels in multiple communication channels.

The multiple sub-channels allocated to the first communication device include multiple resource units (RUs) in multiple 20 MHz communication channels.

The OFDMA transmission is a first OFDMA transmission, and the method further comprises, when the first communication device determines that at least one of the communication channels among the one or more communication channels is idle: receiving, at the first communication device, a third data unit from the second communication device, wherein the third data unit includes an indication of a second set of one or more sub-channels in the at least one communication channel that is determined to be idle, and wherein the third data unit is configured to prompt the first communication device to transmit as part of a second OFDMA transmission; generating, at the first communication device, a fourth data unit for transmission; and responsive to receiving the third data unit, transmitting, by the first communication device, the fourth data unit to the second communication device as part of a second OFDMA transmission, wherein the fourth data unit is transmitted in the indicated second set of one or more sub-channels.

The method further comprises: measuring, at the first communication device, one or more respective energy signal levels for the one or more communication channels during a time period after receiving the first data unit; wherein determining the channel availability information for the one or more communication channels comprises determining the channel availability information using the one or more respective energy signal levels.

The method further comprises: measuring, at the first communication device, one or more respective energy signal levels for the one or more communication channels during a time period prior to receiving the first data unit; wherein determining the channel availability information for the one or more communication channels comprises determining the channel availability information using the one or more respective energy signal levels.

In another embodiment, an apparatus comprises a network interface device associated with a first communication device, wherein the network interface device is implemented using one or more integrated circuits (ICs). The one or more ICs are configured to: receive, from a second communication device, a first data unit via one or more communication channels, wherein the first data unit includes an indication of a first set of one or more sub-channels allocated to the first communication device, and wherein the first data unit is configured to prompt the first communication device to transmit channel availability information as part of a subsequent orthogonal frequency division multiple access (OFDMA) transmission; determine channel availability information for the one or more communication channels; and when the network interface device determines that at least one of the communication channels among the one or more communication channels is idle, transmit a second data unit to the second communication device as part of the OFDMA transmission, wherein the second data unit includes the channel availability information, and wherein the second data unit is transmitted in one or more allocated sub-channels, among the first set of one or more sub-channels allocated to the first communication device.

In other embodiments, the apparatus further comprises one of, or any suitable combination of two or more of, the following features.

The first set of one or more sub-channels allocated to the first communication device includes multiple sub-channels in multiple communication channels.

The multiple sub-channels allocated to the first communication device include multiple resource units (RUs) in multiple 20 MHz communication channels.

The OFDMA transmission is a first OFDMA transmission, and wherein the one or more ICs are further configured to, when the first communication device determines that at least one of the communication channels among the one or more communication channels is idle: receive a third data unit from the second communication device, wherein the third data unit includes an indication of a second set of one or more sub-channels in the at least one communication channel that is determined to be idle, and wherein the third data unit is configured to prompt the first communication device to transmit as part of a second OFDMA transmission; generate a fourth data unit for transmission; and responsive to receiving the third data unit, transmit the fourth data unit to the second communication device as part of a second OFDMA transmission, wherein the fourth data unit is transmitted in the indicated second set of one or more sub-channels.

The one or more ICs are further configured to: measure one or more respective energy signal levels for the one or more communication channels during a time period after receiving the first data unit; and determine the channel availability information for the one or more communication channels using the one or more respective energy signal levels.

The one or more ICs are further configured to: measure one or more respective energy signal levels for the one or more communication channels during a time period prior to receiving the first data unit; and determine the channel availability information for the one or more communication channels using the one or more respective energy signal levels.

In yet another embodiment, a method for communication between a first communication device and a plurality of second communication devices via one or more communication channels includes: allocating, at the first communication device, a plurality of sub-channels, among the one or more communication channels, to the plurality of second communication devices to generate first allocation information that indicates a first allocation of the plurality of sub-channels to the plurality of second communication devices; generating, at the first communication device, a first physical layer (PHY) data unit that includes the first allocation information, wherein the first PHY data unit also includes information configured to prompt the plurality of second communication devices to provide channel availability information in response to the first PHY data unit; transmitting, by the first communication device, the first PHY data unit to the plurality of second communication devices via the one or more communication channels; receiving, at the first communication device, first uplink orthogonal frequency division multiple access (OFDMA) transmissions from at least some second communication devices in the plurality of second communication devices in response to the first PHY data unit, wherein the first uplink OFDMA transmissions include respective channel availability information from respective second communication devices; and allocating, at the first communication device, the plurality of sub-channels to the at least some second communication devices using the respective channel availability information to generate second allocation information that indicates a second allocation of the plurality of sub-channels to the at least some second communication devices.

In other embodiments, the method further includes one of, or any suitable combination of two or more of, the following features.

The method further comprises: generating, at the first communication device, a second PHY data unit that includes the second allocation information, wherein the second PHY data unit also includes information configured to prompt the at least some second communication devices to provide data in response to the second PHY data unit; transmitting, by the first communication device, the second PHY data unit to the at least some second communication devices via the one or more communication channels; and receiving, at the first communication device, second uplink OFDMA transmissions from the at least some second communication devices in response to the second. PHY data unit, wherein the second uplink OFDMA transmissions include respective data from respective second communication devices.

Allocating the plurality of sub-channels to the plurality of second communication devices to generate the first allocation information includes, for multiple second communication devices among the plurality of second communication devices: allocating multiple sub-channels in multiple communication channels to each of at least some of the multiple second communication devices.

Allocating multiple sub-channels in multiple communication channels to each of the at least some of the multiple second communication devices includes allocating multiple resource units (RUs) in multiple 20 MHz communication channels to each of the at least some of the multiple second communication devices.

In still another embodiment, an apparatus comprises a network interface device associated with a first communication device, wherein the network interface device is implemented using one or more integrated circuits (ICs). The one or more ICs are configured to: allocate a plurality of sub-channels, among one or more communication channels, to a plurality of second communication devices to generate first allocation information that indicates a first allocation of the plurality of sub-channels to the plurality of second communication devices; generate a first physical layer (PHY) data unit that includes the first allocation information, wherein the first PHY data unit also includes information configured to prompt the plurality of second communication devices to provide channel availability information in response to the first PHY data unit; transmit the first PHY data unit to the plurality of second communication devices via the one or more communication channels; receive first uplink orthogonal frequency division multiple access (OFDMA) transmissions from at least some second communication devices in the plurality of second communication devices in response to the first PHY data unit, wherein the first uplink OFDMA transmissions include respective channel availability information from respective second communication devices; and allocate the plurality of sub-channels to the at least some second communication devices using the respective channel availability information to generate second allocation information that indicates a second allocation of the plurality of sub-channels to the at least some second communication devices.

In other embodiments, the apparatus further comprises one of, or any suitable combination of two or more of, the following features.

The one or more ICs are further configured to: generate a second PHY data unit that includes the second allocation information, wherein the second PHY data unit also includes information configured to prompt the at least some second communication devices to provide data in response to the second PHY data unit; transmit the second PHY data unit to the at least some second communication devices via the one or more communication channels; and receive second uplink OFDMA transmissions from the at least some second communication devices in response to the second PHY data unit, wherein the second uplink OFDMA transmissions include respective data from respective second communication devices.

The one or more ICs are configured to allocate the plurality of sub-channels to the plurality of second communication devices at least by: allocating multiple sub-channels in multiple communication channels to each of at least some second communication devices.

Allocating multiple sub-channels in multiple communication channels to each of the at least some multiple second communication devices includes allocating multiple resource units (RUs) in multiple 20 MHz communication channels to each of the at least some multiple second communication devices.

In another embodiment, a method includes: receiving, at a communication device, a physical layer (PHY) data unit from a second communication device, wherein the PHY data unit indicates one or more sub-channels of one or more communication channels in connection with a subsequent orthogonal frequency division multiple access (OFDMA) transmission to the second communication device; using, at the first communication device, an energy signal level measurement made during a time period prior to reception of the PHY data unit to determine channel availability information; and using, at the communication device, the channel availability information in conjunction with an OFDMA transmission to be performed in response to the PHY data unit.

In other embodiments, the method further includes one of, or any suitable combination of two or more of, the following features.

Using the channel availability information includes determining whether to participate in the OFDMA transmission to be performed in response to the PHY data unit.

Using the channel availability information includes determining in which of multiple communication channels to transmit as part of the OFDMA transmission.

Using the channel availability information includes: generating, at the first communication device, a data unit that includes the channel availability information; and transmitting, by the first communication device, the data unit that includes the channel availability information as part of the OFDMA transmission.

In yet another embodiment, an apparatus comprises: a network interface device associated with a first communication device, wherein the network interface device is implemented using one or more integrated circuits (ICs). The one or more ICs are configured to: receive a physical layer (PHY) data unit from a second communication device, wherein the PHY data unit indicates one or more sub-channels of one or more communication channels in connection with a subsequent orthogonal frequency division multiple access (OFDMA) transmission to the second communication device; use an energy signal level measurement made during a time period prior to reception of the PHY data unit to determine channel availability information; and use the channel availability information in conjunction with an OFDMA transmission to be performed in response to the PHY data unit.

In other embodiments, the apparatus further comprises one of, or any suitable combination of two or more of, the following features.

The one or more ICs are configured to use the channel availability information to determine whether the first communication device will participate in the OFDMA transmission to be performed in response to the PHY data unit.

The one or more ICs are configured to use the channel availability information to determine in which of multiple communication channels the first communication device will transmit as part of the OFDMA transmission.

The one or more ICs are configured to: use the channel availability information to generate a data unit that includes the channel availability information; and cause the first communication device to transmit the data unit that includes the channel availability information as part of the OFDMA transmission.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
receiving, at a first communication device, a first physical layer (PHY) data unit from a second communication device via one or more 20 MHz communication channels, wherein the first PHY data unit includes an indication of multiple first resource units (RUs) in a first set of multiple 20 MHz communication channels allocated for participating in a first orthogonal frequency division multiple access (OFDMA) transmission to the second communication device, wherein the first PHY data unit is configured to prompt the first communication device to transmit a channel availability information bitmap in a second PHY data unit as part of the first OFDMA transmission, and wherein the channel availability information bitmap is for a second OFDMA transmission to the second communication device after the first OFDMA transmission;
in response to receiving the first PHY data unit, determining, at the first communication device, the channel availability information bitmap for a plurality of communication channels, wherein respective bits in the channel availability information bitmap correspond to respective communication channels among the plurality of communication channels, and wherein the respective bits indicate whether the respective communication channels are idle; and
when the first communication device determines that at least one of the 20 MHz communication channels among the first set of multiple 20 MHz communication channels is idle and in response to receiving the first PHY data unit,
selecting, by the first communication device, one of the multiple first RUs that is in a 20 MHz communication channel determined to be idle, and
transmitting, by the first communication device, the second PHY data unit to the second communication device as part of the first OFDMA transmission, wherein the second PHY data unit includes the channel availability information bitmap, and wherein transmitting the second PHY data unit includes transmitting the channel availability bitmap in the selected first RU within the 20 MHz communication channel determined to be idle.

2. The method of claim 1, wherein the method further comprises, when the first communication device determines that at least one of the 20 MHz communication channels among the first set of multiple 20 MHz communication channels is idle:
receiving, at the first communication device, a third PHY data unit from the second communication device, wherein the third PHY data unit includes an indication of a second RU in the at least one 20 MHz communication channel that is determined to be idle, and wherein the third PHY data unit is configured to prompt the first communication device to transmit a fourth PHY data unit as part of the second OFDMA transmission;
generating, at the first communication device, the fourth PHY data unit for transmission; and
responsive to receiving the third PHY data unit, transmitting, by the first communication device, the fourth PHY data unit to the second communication device as part of the second OFDMA transmission, wherein the fourth PHY data unit is transmitted in the indicated second RU.

3. The method of claim 1, further comprising:
measuring, at the first communication device, a plurality of respective energy signal levels for the plurality of communication channels during a time period after receiving the first PHY data unit;
wherein determining the channel availability information bitmap for the plurality of communication channels comprises determining the channel availability information bitmap using the plurality of respective energy signal levels.

4. The method of claim 1, further comprising:
measuring, at the first communication device, a plurality of respective energy signal levels for the plurality of communication channels during a time period prior to receiving the first PHY data unit;
wherein determining the channel availability information bitmap for the plurality of communication channels comprises determining the channel availability information bitmap using the plurality of respective energy signal levels.

5. An apparatus, comprising:
a network interface device associated with a first communication device, wherein the network interface device is implemented using one or more integrated circuits (ICs), wherein the one or more ICs are configured to:
receive, from a second communication device, a first physical layer (PHY) data unit via one or more communication channels, wherein the first PHY data unit includes an indication of multiple first resource units (RUs) in a first set of multiple 20 MHz communication channels allocated for participating in a first orthogonal frequency division multiple access (OFDMA) transmission to the second communication device, wherein the first PHY data unit is configured to prompt the first communication device to transmit a channel availability information bitmap in a second PHY data unit as part of the first OFDMA transmission, and wherein the channel availability information bitmap is for a second OFDMA transmission to the second communication device after the first OFDMA transmission;

in response to receiving the first PHY data unit, determine the channel availability information bitmap for a plurality of communication channels, wherein respective bits in the channel availability information bitmap correspond to respective communication channels among the plurality of communication channels, and wherein the respective bits indicate whether the respective communication channels are idle; and when the network interface device determines that at least one of the communication channels among the first set of multiple 20 MHz communication channels is idle and in response to receiving the first PHY data unit,
  select one of the multiple first RUs that is in a 20 MHz communication channel determined to be idle, and
  transmit the second PHY data unit to the second communication device as part of the first OFDMA transmission, wherein the second PHY data unit includes the channel availability information bitmap, and wherein transmitting the second PHY data unit includes transmitting the channel availability bitmap in the selected first RU within the 20 MHz communication channel determined to be idle.

6. The apparatus of claim 5, wherein the one or more ICs are further configured to, when the first communication device determines that at least one of the communication channels among the first set of multiple 20 MHz communication channels is idle:
  receive a third PHY data unit from the second communication device, wherein the third PHY data unit includes an indication of a second RU in the at least one 20 MHz communication channel that is determined to be idle, and wherein the third PHY data unit is configured to prompt the first communication device to transmit a fourth PHY data unit as part of the second OFDMA transmission;
  generate the fourth PHY data unit for transmission; and
  responsive to receiving the third PHY data unit, transmitting, by the first communication device, the fourth PHY data unit to the second communication device as part of the second OFDMA transmission, wherein the fourth PHY data unit is transmitted in the indicated second RU.

7. The apparatus of claim 5, wherein the one or more ICs are further configured to:
  measure a plurality of respective energy signal levels for the plurality of communication channels during a time period after receiving the first PHY data unit; and
  determine the channel availability information bitmap for the one or more communication channels using the plurality of respective energy signal levels.

8. The apparatus of claim 5, wherein the one or more ICs are further configured to:
  measure a plurality of respective energy signal levels for the plurality of communication channels during a time period prior to receiving the first PHY data unit; and
  determine the channel availability information bitmap for the plurality of communication channels using the plurality of respective energy signal levels.

\* \* \* \* \*